(12) United States Patent
Chacko

(10) Patent No.: US 12,432,247 B2
(45) Date of Patent: Sep. 30, 2025

(54) ZERO TRUST DATA CASTLE SYSTEM WITH SECURITY OPERATION METHODS FOR ACTIVE RESPONSE

(71) Applicant: Peter Chacko, Ernakulam (IN)

(72) Inventor: Peter Chacko, Ernakulam (IN)

(73) Assignee: Peter Chacko (IN)

( * ) Notice: Subject to any disclaimer, the term of this patent is extended or adjusted under 35 U.S.C. 154(b) by 225 days.

(21) Appl. No.: 18/087,759

(22) Filed: Dec. 22, 2022

(65) Prior Publication Data
US 2023/0199017 A1 Jun. 22, 2023

(30) Foreign Application Priority Data
Dec. 22, 2021 (IN) .............................. 202141058710

(51) Int. Cl.
*H04W 12/06* (2021.01)
*H04L 9/40* (2022.01)
*H04W 12/08* (2021.01)

(52) U.S. Cl.
CPC ...... *H04L 63/1433* (2013.01); *H04L 63/1416* (2013.01); *H04L 63/145* (2013.01)

(58) Field of Classification Search
CPC ............. H04L 63/1433; H04L 63/1416; H04L 63/145
USPC ......................................................... 726/22
See application file for complete search history.

(56) References Cited

U.S. PATENT DOCUMENTS

| | | | |
|---|---|---|---|
| 12,184,667 B2* | 12/2024 | Chacko | H04L 63/1466 |
| 2004/0120334 A1* | 6/2004 | Nation | H04L 47/266 |
| | | | 370/469 |
| 2007/0027998 A1* | 2/2007 | Staats | H04L 12/40117 |
| | | | 709/230 |
| 2008/0215789 A1* | 9/2008 | Matsuda | G06F 13/28 |
| | | | 710/308 |
| 2010/0157385 A1* | 6/2010 | Fukasawa | H04N 1/0057 |
| | | | 358/474 |
| 2012/0131621 A1* | 5/2012 | Kanojia | H04N 21/2747 |
| | | | 725/93 |
| 2014/0153993 A1* | 6/2014 | Ono | B41J 11/663 |
| | | | 400/621 |
| 2015/0145949 A1* | 5/2015 | Olivier | H04L 67/1095 |
| | | | 370/352 |

\* cited by examiner

*Primary Examiner* — Haresh N Patel

(57) ABSTRACT

The present disclosure relates to attack-tolerant storage system architecture with active response methods against different forms of storage intrusion for data at-rest, under-operation and in-motion as an integrated system design. System is built upon a Storage security controller (SG nodes), USC, overlay network of DTC nodes attached to SG nodes. System security modules are deployed across various geo locations in a Wide Area Network. USC extracts system, security and storage activity telemetry data from Secure Vaults, Storage Gateways and inter-site data transfer systems to orchestrate autonomous security Operations. SG nodes create SP fragments and store in SV nodes or move it across DTC nodes upon data operations. SG nodes are connected to SV nodes which are micro-segmented, data vaults with restricted network reachability. Kill-Data-Service methods and other Active Response security methods are triggered from SG nodes or at DTC nodes, as part of AR operations, orchestrated by USC.

9 Claims, 18 Drawing Sheets

| DTG 1 | DTG 4 | DTG 3 | DTG 5 |
|---|---|---|---|
| DTG 1 | DTG 2 | DTG 5 | X |
| DTG 1 | DTG 6 | DTG 5 | X |

DTG1 < ········ > DTG 5

Fig 14

TABLE 1

| INTRUSION EVENT | CODES |
|---|---|
| NONE | 01 |
| INSIDER THEFT | 02 |
| RANSOMEWARE ATTACK | 03 |
| CYBER ATTACK | 04 |
| SYSTEM ISSUES | 05 |

Fig 15

ZERO TRUST DATA CASTLE SYSTEM WITH SECURITY OPERATION METHODS FOR ACTIVE RESPONSE

PRIORITY STATEMENT

The present application hereby claims priority to Indian patent application number "202141058710" filed on Dec. 22, 2022, the entire content of which are hereby incorporated herein by reference.

TECHNICAL FIELD OF THE INVENTION

The present disclosure is related to a storage system design with Cyber security and attack tolerance by-design. Storage systems are traditionally built for performance, scalability, availability, and data integrity with traditional security features added as an after-thought. The invention relates to a system design and a set of methods against storage intrusions. New attack vectors such a Ransomware, malicious insiders, various forms of cyber-attacks and Quantum computing attacks on crypto need a new approach to storage security, with an end to end approach including data at-rest, in-motion, and under-operation.

BACKGROUND

Conventional Storage systems have been built with primary goals of performance of a storage system, scalability, and reliability aspects. It was assumed that data can be stored securely, inside a secure perimeter of a corporation and hence network security systems and other perimeter level security measures would protect data from external attacks. Such storage systems added security on a "Bolted on" approach rather than "Bolted in". Encryption, authentication, and identity management offer good amount of security but are not built as an integrated solution and does not look at end to end perspective over data lifecycle when data is at-rest and in-motion. Conventional storage systems do not address end to end data-centric security given the dynamic aspects of storage as it is processed by applications or the implications of data being moved around as part of various data management operations, in the context of Ransomware attacks, malicious insiders and quantum computing attacks on encrypted data streams.

SUMMARY OF THE INVENTION

The present disclosure relates to a set of methods and architecture for implementing cyber risk mitigation and information security services on data at-rest, under-operation and in-motion as an end to end system, acting like a "castle" for attack tolerance. The present disclosure applies to real time storage intrusion detection and active response for protecting data across on-Premise, IaaS, PaaS, SaaS data sources, Cloud-Native platforms and hybrid-storage clouds as the invention can be applied to any type of IT platforms. Invention implements the equivalent of intrusion detection and extended detection response (XDR) as available in networking industry, to the world of storage with a "castle" like data architecture. In ancient British history, we see that Kings built "Castle" to help them from attacks by their enemies with an attack tolerance as part of the design. Invention provides an equivalent in the world of storage architecture, with security at-rest, in-storage and under-operation paradigm, characterized by attack avoidance and tolerance architecture than driven by just prevention. Multiple embodiments can be created out of the invention applying to only a subset of the attack scenarios, such as a solution only for data in-motion or exclusive for security at-rest or both aspects.

The unique aspects of the present disclosure disclose the active response capabilities of a storage system having various data protection services against a threat detected, a way data is stored in isolated, secure vaults, and how storage data is migrated or transferred across borders of security domains or jurisdictions with Exclusive-Path forwarding and also how storage activity is monitored during under-operation phase. The present disclosure discloses security features by architecture particularly used to mitigate cyber security risks from wire-tapping or ransomware breaches. The present disclosure shows the end-to-end security and safety guarantees for the data during data movements and at rest with quantum-safe data security leveraging, aspects related to information theoretical security as opposed to computational security. Computational security can be challenged and can be broken by quantum computing resources, which is extremely fast for certain computations such as the mathematical side of the encryption whereas information theoretical security is safe in the context of quantum computing based attacks, unless the attacker gets hold of a majority sum of the pieces of the data blocks which is more difficult. The present disclosure discloses novel ways of securing data from crypto attacks, ransomware attacks, wiretapping and quantum attacks, and insider attacks and thereby provides a life-cycled, end to end solution converging safety and security. Such a solution is unheard in the security industry and enables new use cases and improves the security and data control radically. The present disclosure discloses multi-vectored, multi-layered security services built into data storage systems. Solution is multi-layered as multiple layers of security methods offer independent aspects of security capabilities. Invention is multi-vectored because the invention blends mathematics, system security aspects, secure network isolation, Exclusive-Path data forwarding combining novel methods from multiple domains of IT architecture.

In one embodiment, the present disclosure discloses about protection from data thefts and ransomware attack in real time with active responses. Conventional storage systems only audit or send alerts in some cases, which is not paired with real time active responses. Conventional storage systems have drawbacks associated with data intrusion, ransomware attacks, and various forms of data leakage through wiretapping. The present disclosure discloses disaggregated security services that include storage activity monitoring and active response to attacks, where actual data is protected in multi-segmented, logically air-gapped, immutable data vaults. These multi-segmented vaults make use of various forms of information theory to make it safe from quantum computing attacks which is under constant security surveillance from other components.

BRIEF DESCRIPTION OF DRAWINGS

FIG. 14 is a table indicating an example of an exclusive CFR List used in the overlay.

FIG. 15 is a table indicating RIDE parameters and RIM codes used at USC controller.

DETAILED DESCRIPTION OF THE INVENTION

Figure 1:
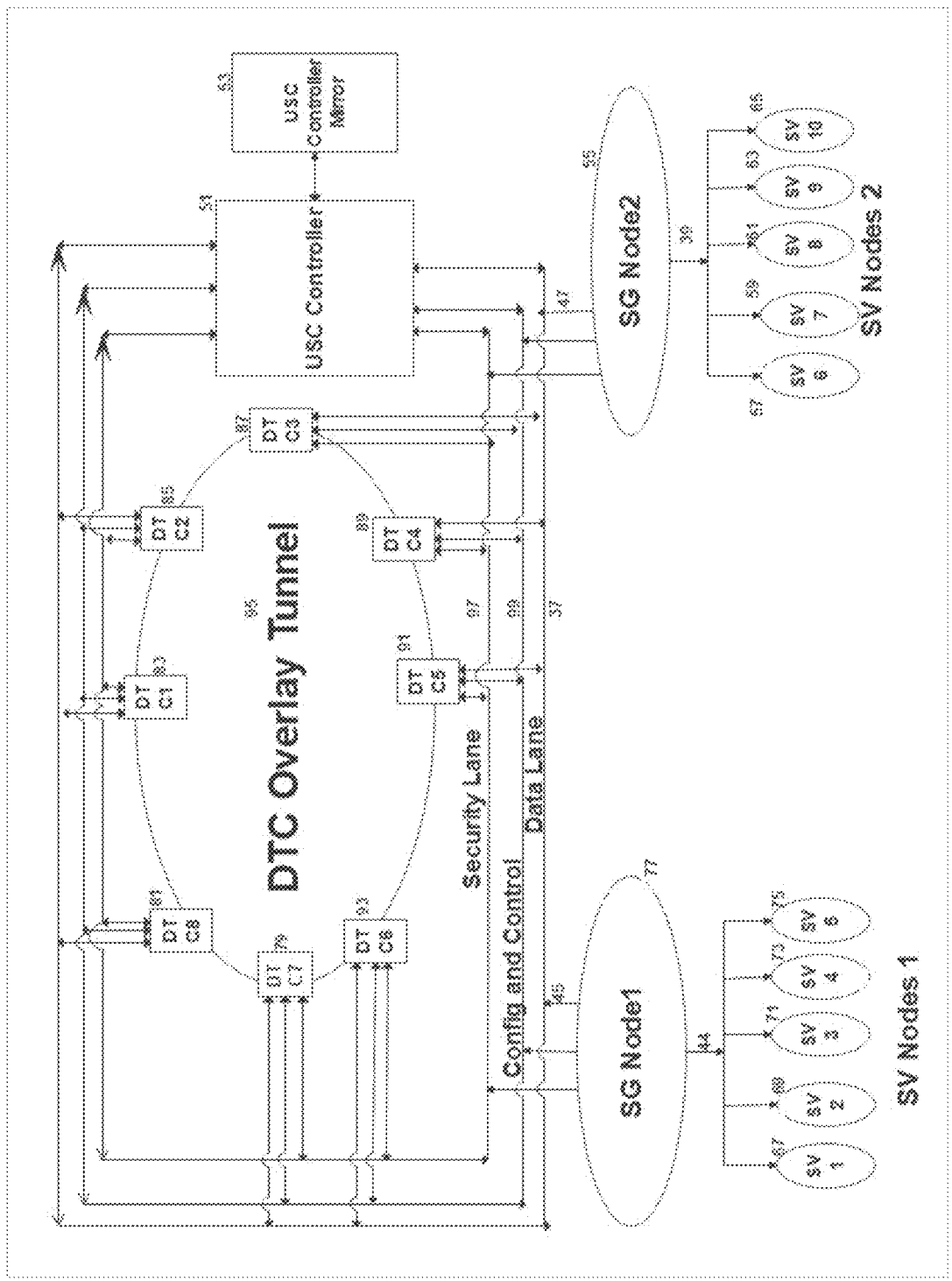
FIG. 1 is a block diagram illustrating an exemplary embodiment with two set of Secure Vaults attached to two different SG nodes, Content Forward Router overlay network and USC controller.

The foregoing description has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The process features or functions of the present disclosure can be implemented by a computing device. As an example, computing device may include enterprise servers, application servers, workstations, personal computers, network computers, network appliances, personal digital assistants, set-top boxes, and personal communication devices.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended. For example, as an aid to understanding, the detail description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to the present disclosure containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the above detailed description.

In one embodiment, aspects of the present disclosure can be applied to an overlay cloud services or any system having data or metadata assets needing real time data risk mitigation from various attacks. Such systems include single, stand-alone systems running applications, Simple Mail Transfer Protocol (SMTP) based E-mail contents, database systems like MySQL®, ORACLE®, MongoDB®, Cassandra® or any Structured Query Language (SQL) or Not only SQL (NoSQL) like data stores. The aspects of the present disclosure can be extended to modern IT platforms like cloud-native applications running on Kubernetes based IT stack, Open Stack or any Inter-site data transport or migration systems. The central component of the aspects of the present disclosure is the Storage Security Controller, also referred as SG node, moving data across Data Transport Controller overlay tunnels and storing data at Micro-segmented data vaults, operating in lockstep with the commands and controls from Universal Security Controller. Invention can be applied to file transfer protocol (FTP) data traffic or SMTP data traffic to secure file transfer and mail transfer content from various forms of cyber-attacks.

Significance of the Invention

Invention is acutely significant as quantum computing, ransomware and insider attacks are serious threats of modern times challenging storage systems. Computational security systems can be broken by enough compute power, which is possible once quantum computing is a reality in the next 5-10 years. Though lattice cryptography is the new encryption solution that resists quantum computing, it is not available as part of existing Virtual Private Network (VPN) and Secure Socket Shell (SSL) systems and Storage systems for prime use. Furthermore, encryption systems always must manage crypto keys which are often cumbersome for long term data protection. In addition, the invention offers information theoretic security that does away with all forms of encryption key management as information theory is unbreakable to computing attacks. Industry has produced many intrusions detection and prevention systems to networks, but no real products for intrusion and mitigation at storage level as the data moves in space and time. Invention provides various methods and architecture to realize end to end, content level intrusion response against ransomware attacks, system intrusion, storage intrusion and crypto breaks for data at-rest and data in-motion, with "Castle" like data risk mitigation methods.

Some technical terms of the present disclosure described below.

Storage Security controller or Storage Gateway Nodes (SG Nodes): This is a key part of the core invention, connecting other parts of storage at-rest and storage in-motion. Physical or virtual systems having the ability to deliver data in either direction typically backed by a file system or cloud provider APIs or can be a gateway or proxy service to other forms of any standard storage systems. SG nodes communicate to USC on behalf of SV nodes for all security control and play the role of storage security controller.

Data Transport Controller (DTC) (referred also as DTG node or CFR node or DTC node) overlay tunnel: This is the core component of the Architecture. Data transport Controllers is also referred as Data Transport Gateways (DTG node) or Content Forwarding Routers (CFR node), interchangeably in the disclosure and are placed at various locations in the wide area network or internet, running in physical or virtual machines that moves the data payload to next CFR node or Initiating or Terminating the content journey in the WAN, moving the content through a pre-meditated secure paths across various DTC nodes. DTCs constantly sync various security data and inter DTC state data graph with USC. State data graph is a graph data structure, based on standard graph data structure, representing the available DTC in the overlay network of DTC. A plurality of DTC Nodes make up a DTC overlay tunnel or function as a Secure Storage Routing overlay network.

Universal Security Controller Node (USC Node): This is the Security Control Center part of the core invention and may also referred as USC that has various modules integrated for metadata, security contexts, and system and storage activity telemetry data captured from different systems. USC is also referred as System controller or Security Controller interchangeably in the specifications.

AIOps: Artificial Intelligence driven Operations, A mechanism by which a set of IT operations can be invoked, driven by Artificial intelligence or related technologies based on data fed into the system to facilitate preventive IT operations. This simplified IT through Automation.

Security and system agents: These are systems having programmed instructions to send various security activity or system activity or storage activity related data to USC to enable USC to make the right responsive reactions based on the configured security and data safety policies. These modules are placed at Secure Vault Nodes, Storage Gateway Nodes and DTC Nodes.

Data protection agents or gateways: These systems are deployed at various locations needing data protection services delivered as part of active responses to various cyber or insider attacks. Data protection agents constantly communicate to USC. USC trigger Context Risk Mitigation operations leveraging Data protection gateways.

USC agent module: This is a module that is installed in DTC Node, SG Node and SV Node which has system programs that can navigate file systems, look up file changes, compare file modifications against normal changes or abnormal changes such as ransomware activity and also examine system activity such as any abnormal spike in number of processes running indicating a Denial-of-Service Attack. This module can also send system or security specific data or metadata to USC.

Ransomware attack signatures: Ransomware attack pattern is a list of matching storage activity change rules. It can be as simple as a rule that flags the storage activity as a ransomware attack if most of the files in a directory or list of directories are changed in the last 30 minutes. This denotes the tell-tale signs of ransomware attacks into the systems. Ransomware can encrypt a file, cause full file change, remove the contents, make drastic configuration changes, rename files, changes of the original file name so on and so forth. Ransomware can do data exfiltration which translates to huge data transfer across network. Infection signatures can be used to detect any ransomware attack pattern. There are various methods of detecting ransomware attack signature, like, rate of change of data activity from normal IO activity profile stored in the USC, rate of change of a file from its normal rate of change, rate of change of different files in a directory and overall file change entropy. Security agents keep on sending various storage activity data to USC, for anomaly detection. All types of these activity data, indicating various intrusions, are called RIDE (Real time Intrusion Detection Events) parameters or Intrusion Indication parameters (IIP). USC also make use of storage honey spot files that any ransomware will treat as target customer data, which will immediately indicate as a storage intrusion to USC. Such honeypot files can be deployed at any system, DTC nodes, on protected hosts, data protection gateways, secure vaults or at SG Node modules or at any connected system having critical or sensitive file data stores needing protection from various malware attacks. USC will then initiate various active response actions to data protection agents or to data vaults hosting actual user data. USC will disable the update phase of existing gold copy of data if there is a malware or ransomware activity detected. USC can freeze out any DTC which is attacked by ransomware and SG node can disable data movements to or from SV nodes killing the data path, all in real time. This feature is facilitated by the continuous security monitoring and CRM operations to prevent further attack and containing the attacks at source. Disclosure defines this as RAMS (Ransomware Attack Mitigation System) or as Ransomware Attack Resilience System (RARS).

USC keeps learning the storage activity patterns and updates its databases on what changes are to be considered as attack signature by continually applying Machine Learning rules against what a Security Administrator flags as normal data change or not.

Data Vault: When data is stored in any public cloud storage based on some form of object storage, it is referred as data vaults. Data Vaults run in generalized manner and have open ports for receiving connections. This option is chosen according to the specific requirements of the embodiments and is also referred as Data Containers.

Secure Vault Nodes (SV Nodes): This is the enabling component to implement security at-rest part of the specification. It is very common to store file level data in file systems or in object storage systems for scalability. Typical object server has an IP and a port running the API server which is accessible from any network service. Further aspects of the Secure Vault and its operation follows next Security Parameters, Configuration Parameters and Control Commands: SG node, keep running various commands looking for abnormal observations. Example include a sudden surge of failed Secure Shell (SSH) login attempts, sudden surge in number of processes, abnormal file changes and so on and so forth. This information is collected and sent to USC controller. USC controller then processes it and looks for any rule match and send descriptors of instructions to be executed at SG node. These response data is referred as control commands. Configuration parameters include the data for proper operation of USC. And can also include the mode of operation of various components as a standard practice of any IT based operations systems.

Security Operations: Invention invokes various security operations at the control of other components, as part of active response workflows, on a control loop automation manner, when an intrusion is detected. This includes a real time service shut-down, removal of existing security configurations, immediate data migration and so and so forth. Invocation of various security operations at the control of other components is a core part of a data castle like system design. These operations are referred as Active Response commands.

Data input operation and Data output operation: This term refers to any method through which a user can upload content or download content from an exemplary embodiment. This can include an FTP based operation or can include a file copy operation to an SG node or from SG node. Data input operation corresponds to the data arrival and Data output corresponds to data retrieval by an end user, such as during a data transfer process.

Figure 13:
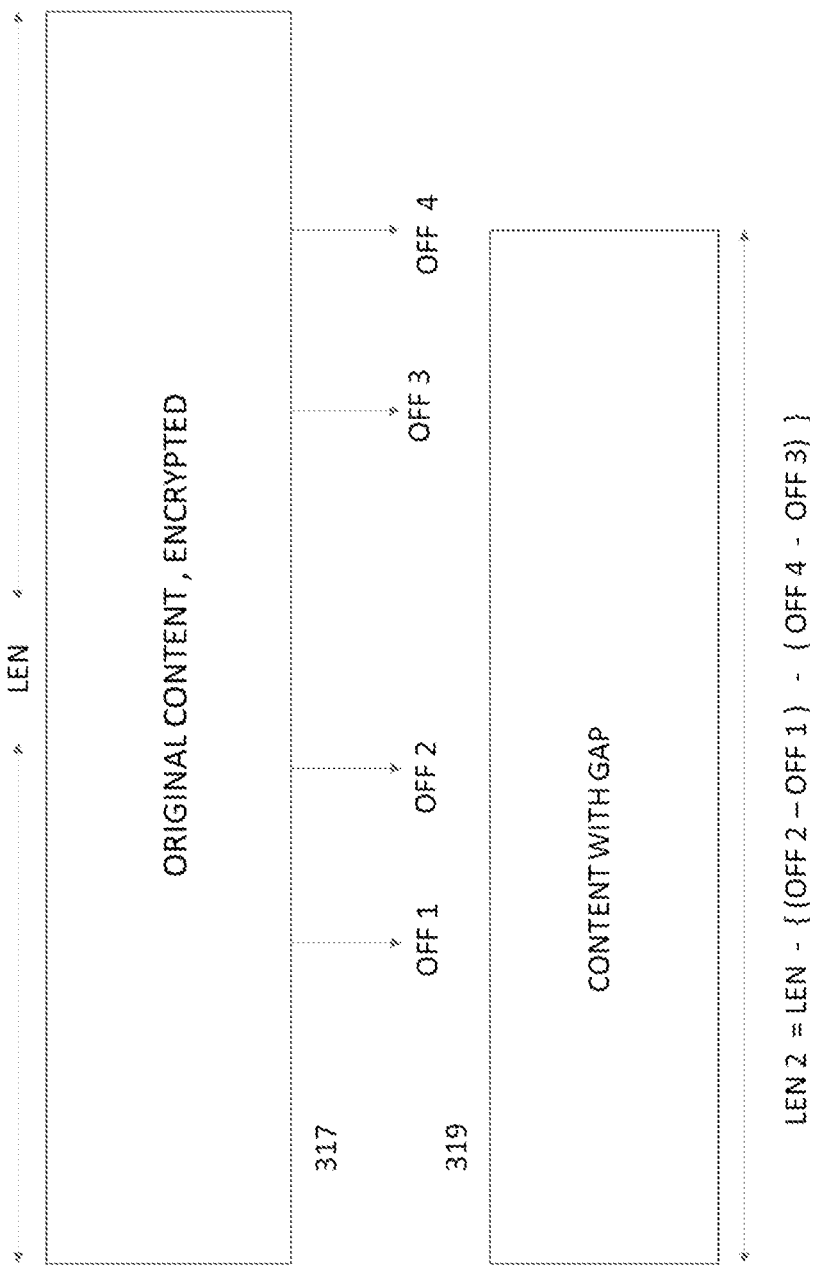
FIG. 13 shows the aspects of data redactions aspect of content fragmentation.

SP fragments (or also referred as fragments): Invention make use of reed Solomon erasure coding to split the content into different unintelligible partitions. If data is dispersed after encryption, with encryption keys stored in the content itself, each fragment of the content after the split is cryptographically unintelligible. In reed Solomon, a wide combination of N: M is possible, where if a content is split into N pieces, only M pieces needed for full recovery and any combination of pieces up to M-1 reveals no information. Invention uses this mathematics in sending only M pieces of the content in M distinct list of DTC controllers in the overlay. Additionally, before erasure coding, content can be redacted with blocks of data removed as gap blocks. Gap blocks, as it is also portions of encrypted content, cannot be recovered unless inserted back to the original content. Referring to FIG. 13, 317 is an encrypted content in an exemplary embodiment, 319 is the redacted block with data removed from byte level data offsets OFF1 to OFF2 and then OFF3 to OFF4. This redacted data content can be erasure coded and upon final reception at the last DTC, gap block data and gap block metadata information, indicating where the gap offsets are, can be used in re-creating the original content and then decrypt the content using the key contained in the content itself. As this gap blocks and gap block metadata can also be separately sent, even without carrying through DTC nodes, invention provide sufficient mechanisms of wire-tapping avoidance of data in-transit. Reed Solomon, as it is information theory-based data anonymization, cannot be cracked by a quantum computer if one portion is available. In an embodiment, regular data anonymization techniques of various ways can be used instead of RS coding or in combination with RS coding. Even different forms of erasure coding can be used as appropriate. Erasure coding methods itself is prior art. Invention defines these fragmented portions of the content as SP fragments. SP stands for Secret Partition. Re-creation of the original content is the reverse process of RS coding to create the original data, then apply the gap block meta data to insert the gap blocks as per the gap block metadata, and then the decryption. Gap blocks are present only on some embodiments. Disclosure defines this process as the Content Reassembly or CR operations.

Binary Verification or BV operations: Any system can be tampered, and any binary file can be replaced by a malicious adversary. DTC node, SG node has executable instructions that keep calculating the SHA signature of the known binaries compared against the trusted binary signature as stored in the USC controller or any trusted source as implemented in the embodiment in question.

EP forwarding or Exclusive-Path forwarding or EPF operation: This is the crux of DTC operation. Once SP fragments are created at SG node or at the first DTC node as applicable in accordance with the embodiment, every DTC node is to look up the next hop listed in the Content Forwarding Router List (CFR List) created at the first DTC. Different fragments of content are called a fragment set. Only the minimal set of fragments to be needed for full recovery is transferred which is called a minimal fragment set. Each member of the minimal fragment set receives a unique set of path lists, embedded in the fragment, and transmitted by the first DTC. Then every next DTC, simply lookup the list, and updates the next DTC node information as the next hop and send the fragment to the next DTC and this process repeats until the fragment reaches the last DTC node. As each fragment goes through exclusive list of paths, this process is called Exclusive Path forward operation. (EP Forwarding). This can also be used for multi-path forwarding in some contexts. First DTC originates the forwarding by picking the exclusive list of DTC nodes through which the CP fragments have to be forwarded through. Last DTC in the list does the termination and CR operations.

RIDE parameters: RIDE stands for Real time Intrusion Detection Events and RIDE parameters contains various system activity and storage activity info collected from protected systems as a cyber telemetry mechanism. This include information such as login failures, binary file metadata, system activity info mined from various system, network and application log files, Input Output activity, memory info and similar machine and system data used to detect any possible intrusion to systems. Whenever USC or SG node receives RIDE parameters, RIM (Realtime Intrusion Mitigation) codes will be generated to mitigate the risks by getting various CRM operations executed at the affected systems.

Common Methods Used: As for securing data at rest, from ransomware attacks, USC again make use of data dispersal technologies to store it in multiple, isolated segments of storage vaults, to avoid single point of intrusion-attacks. Each segment in itself reveals no information to an attacker. Invention refers to this as micro-segmented data vaulting. While there will be at least 3 or more fragments that are stored in separate vaults, only a subset of those fragments is needed for actual recovery and any single portion reveals no data, even with a quantum computer based attack. USC controller periodically instructs security agents to create storage "honey-pots" to attract ransomware to act upon. Storage honeypots are simply some data specifically stored at protected systems to see if it is changed in some manner, to signal the ransomware entry as it cannot distinguish those files from regular customer data. These storage honeypots can be any normal looking files, with specials file names and folders that cannot be detected by ransomware. These files will be stored in a layer of unique directories with unique file names. And SG node keeps tracks of any file modifications to it and will in real time inform USC. USC will immediately begin Active response services by instructing security agents not to perform data updates on the backup systems. USC will further isolate the system by removing all network connections to it and send critical alerts to data protection administrators configured as human contacts upon any anomaly detection. USC will then instruct the security agents to shut down the system if configured so, to further isolate the system from infecting more connected systems. Security agents are also capable of detecting ransomware attack signatures by profiling the storage activity. As USC has a component of versioned and immutable data backups stored in logically isolated from networks, new ransomware attacks will never affect existing data stored protected. Every new data object or modifications of new data will create a new version of the object. Number of versions can be configured by a user with configurable parameters stored in an Extensible Markup Language (XML) file. File versions can be made incremental or whole file versions. Incremental versioning makes use of change journaling records. Every change is written into a change tracking file with corresponding metadata of version numbers and corresponding change tied to it stored separately. When a user requests a particular version, metadata is looked up, extract the base version, and apply the change journal to recreate the content sought. When a new object version is created, its version numbers are updated in an XML file with its time of creation and date stamp and accounting information such as system user who performed the operation and total storage consumed for previous versions and related data, which are referred as version parameters.

Like Data protection gateways offering real time remote data protection services at the request from USC, DTC nodes are deployed at different parts of the WAN driving the fragment routing across the overlay network when data transfer for storage migration is needed from 1 segment of the vault or multiple vaults to another 1 segment or another set of the vaults located in another country or over long distance. In at least one embodiment, data from one SG node will be routed to another SG node located in another country through many intermediate countries. Always effort is made to route the application data across different set of intermediate countries, using exclusive list of DTC nodes to be forwarded through for the best possible routes without shared list of DTC in the same country and to avoid wire-trapping across borders from a particular nation state funded cyber-attack situation.

USC controller also makes use of data protection agents in addition to security agents deployed at every system. Security agents collect all system activity summary like amount of memory available, number of processes that are running, no of failed login attempts over an SSH connection, list of new binaries installed, list of ports open and similar system information which are collectively termed as intrusion indication parameters (IIP). Similarly, storage activity data include various directories and file change and sent to USC over a Wide Area Network (WAN) connection or through a Local Area Network (LAN) connection. USC receives all telemetry data and feeds it into Log Analyzer, which is a tool that can parse and analyze log data and process the data received against configured data security policies and trigger various commands stored in the USC to instruct the protected systems for appropriate actions. These commands, also called Active Response Operations (AR Operations) or Security Operations as defined earlier, include the system command to initiate a bulk data transfer across the overlay to another set of SV nodes attached to another SG node. This command can be as simple as shutdown some services in affected systems. Any security operator can configure the desired state of the affected systems through a Graphical User Interface (GUI) [GUI]. Command can also include the invocation of a data lockdown, disallowing any user to access any more data. Invention defines this as contextual data protection operations. If security agents detect a ransomware activity, USC can then send an active response back to protected system, instructing the data protection agents not to update the existing data backups with new updates, as it could potentially corrupt the known gold copy. As configured data protection operations can be triggered by USC, based upon the context of systems under surveillance, security risks can be mitigated in real time, during an attack event.

In one exemplary embodiment, detailed data and control flow of the invention is explained below. Setup and Architecture of the embodiment is explained first SG Nodes are connected to USC over any form to Transmission Control Protocol/Internet Protocol (TCP/IP) based WAN. SG Nodes are connected to at least one of the DTC Nodes that terminate TCP connection or any transport protocol end point such as Stream Control Transmission Protocol (SCTP), Multi Path Transmission Control Protocol (MP-TCP), User Datagram Protocol (UDP) or Datagram Congestion Control Protocol (DCCP). DTC node has five parts, namely originator, distributor, terminator, Tx and Rx. Fragment will hit one of the first DTC Node, as part of the overlay network of N*N−1 connected mesh network, originator module will create the header and insert it to the content, re-create the file and push to the forwarding queue. Tx module will send the fragment to the next DTC Node. Rx component of the DTC Node will receive the new fragment forwarded to it, and hand over to the Distributor component which will update forwarding header containing the source path routing list of different DTC Node if forwarding to upstream DTC node is needed. This process will repeat until it reaches the last DTC Node in the overlay network. Terminator component of the DTC Node will then pick up the fragment and handover the SG Node attached to the DTC Node. SG Node will then move the fragment to one of many SV Nodes as its final storage at-rest. Every DTC Node in the systems contacts USC and receives updated Node state information when an existing DTC goes down or a new one is added to the system. Originator module will then redraw the source to destination graph for every destination DTC Nodes connected to it and re-calculate 3 or 5 or 7 distinct paths for the different fragments of the customer data files or data objects or data blocks to be routed by. All route updates, Node state graph updates are done CP (Control Plane) Module. CP module and Security Agents can be integrated as a single module or can be implemented as two separate modules.

Secure vault provides secure network isolation capability to traditional object storage. Secure vault stores data in the form of immutable objects while the system including the objects does not listen via an IP or a port. Secure vault connects SG Node module taking the role as a secure data proxy, using an ephemeral IP and port, gets authenticated through open SSL channel or direct TCP, and initiates a TCP connection. The data proxy performs the role of synchronization of all data without needing a connection initiation to the secure vault. Once TCP connection is established, TCP client takes the role as a server and flow of TCP stream is reversed. Invention defines this as Reverse TCP flow method. Hence, only trusted service running in SG Node module, can exchange data with secure vault through the mechanism of reverse TCP flow, preventing ransomware attack or any form of network intrusion on secure vault. The SG Node modules and secure vault systems are continually monitored through USC. In some embodiments, data containers can be hybrid-cloud storage services or purely public cloud services. Secure Vault or data containers can be built out of a mix of on-premises vaults and cloud services, forming a hybrid-cloud based secure data vault which is connected to SG Node and USC node.

Referring to FIG. 1, representing an exemplary embodiment of the invention, 55 and 77 are two SG nodes. 67,69,71,73 and 75 are the SV nodes attached to SG node1 (labeled as 77). All these SV nodes can be stored in different locations and need no static IP to operate, unlike an object server. 57, 59, 61, 63 and 65 are the SV nodes attached to SG node2, 55. 51 is the USC controller and 53 is its replica for redundancy reasons. 79,81,83,85,87,89,91 and 93 are the 8 DTC controllers are operating in the DTC overlay. 37 is the separate data lanes for moving user content, 97 dedicated for carrying security control data and 99 is used to move configuration and control data.

In one embodiment, when USC controller is configured to operate as a security control point, it will monitor all systems having data resources, for any anomalies, corrupted files, malicious activities, virus activity checking and configuration changes. File hardening and related security monitoring services can be performed as a separate security management feature. All components in the SG Node can get a gold copy of configuration files, security configuration files for operating system (OS) attributes, management data such as various services enabled for each SG Node module and hence various identity verification services can be performed. In any standard system, security and management configuration data can be set by a graphical user interface or through a command line interface at the USC node. USC node then distributes security and management data to SG Nodes and SV nodes. USC constantly monitors every storage input and output activity occurring in SG Node modules and in some embodiments, SV nodes as well by exchanging every system activity logs, storage activity audits to USC, which is subsequently analyzed by a standard log analysis tools at USC. A security administrator can configure various policies and can instruct the USC to remotely shut down the systems having the data stored in SV nodes or SG Node. By default, USC initiate such operations against configured intrusion events such as anomalies in the configuration changes, ransomware activities or different forms of system intrusion.

USC performs monitoring in real time ransomware attack signature. Hence, ransomware attack is detected as part of a new backup epoch update or through pro-active monitoring process. When every new data fails to match the ransomware attack signatures, it will meet the data qualification. Data qualification parameters, indicating ransomware attack signature explained earlier, can be set as frequency of data changes and amount of data changes.

When user data is fragmented according to information theory based on erasure coding combining compression, encryption and deduplication, data is further optimized at compression level and deduplication level. As noted earlier, since secure vault is not listening via any IP or port, network worms such as ransomware cannot penetrate systems hosting SV node.

As known gold copy of actual protected storage is always stored in mathematical pieces through information theoretical dispersal technologies across secure data vaults, stored in logically air-gapped manner with network isolation explained earlier in the disclosure, no ransomware or cyber-attacks can be successful as in any worst-case scenario of SV node was accessed, single vault reveals no information. If any data vault is compromised data still cannot be modified as it is stored in immutable manner with multiple versions. Any new update simply creates a new version Secure Vault also has integrated security agents monitoring system and storage activity and periodically synchronizes the security and system surveillance data with USC. USC then stores the data in its database to improve the machine learning aspects of what normal behavior is and what is not.

All communications across various components like SG node, SV nodes, DTC and USC controller use separate channels for data traffic, security data traffic and control and configuration channel, to avoid a single point of data breach situation of the inter-component communication of the invention. As data is routed across exclusive list of paths in the DTC overlay network, in the worst case of an unlikely intrusion, security data channel on a separate channel will increase the odds of attack avoidance. Similarly, the separate channel when configuration and control commands are transferred. A channel can be separate lists of DTC controllers, that the traffic is forwarded through or can be a separate connection across a different provider network or any other form of increasing the probability of moving data across two end points through distinct set of network intermediaries.

Another salient aspect of the invention is de-duplication in-motion as the content is transmitted through DTCs. Data flows to final DTC node through a number of forwarding DTC nodes. Fingerprints and unique data block are created and stored and cached at every forwarding DTC node in the path to avoid further data movements across the node if it is the same content block. First DTC nodes exchange Secure Hash Algorithm (SHA) fingerprints to each connected DTC nodes which are part of the exclusive path. Based on the replies, DTC node packages the full data chunks or only de-dup metadata, accordingly, to avoid redundant data transfer from each DTC node to other DTC node next in the path list. Upon reception, DTC can recreate the data from the chunk store with de-dup metadata if this particular chunk was already traversed through the DTC, which is stored in the attached SV node of the terminating DTC node. Content is then delivered to the final recipient. Data is transported from any user located in any part of the world through an upload process. Upload process results in data getting pushed into an entry node in an overlay tunnel. First node will divide the file into different units of blocks based on various algorithms. SHA fingerprints are communicated to all nodes which are part of the end to end data forwarding. Any block with unique SHA hash will traverse only once through any forwarding node. Data originating node will first exchange SHA with destination node for the block in hand for transmission. If no block found, prepare the transmission for the hop-by-hop transmission with SHA exchange performed and transmit if none of the hop that follows the next hop has the block cached. This way, no data block is needlessly transmitted across the overlay, radically reducing the data transferred and also to improve cyber security readiness as no one can do wiretapping and data compromise because only a portion of the data blocks transmitted on repeat data flows, with various data transformations including erasure coding. This is not the case of a conventional storage deduplication. With this method, all content forwarding nodes will accumulate unique storage blocks and eliminate the need for repeated communication of content from the preceding node in the forwarding path.

Figure 10:
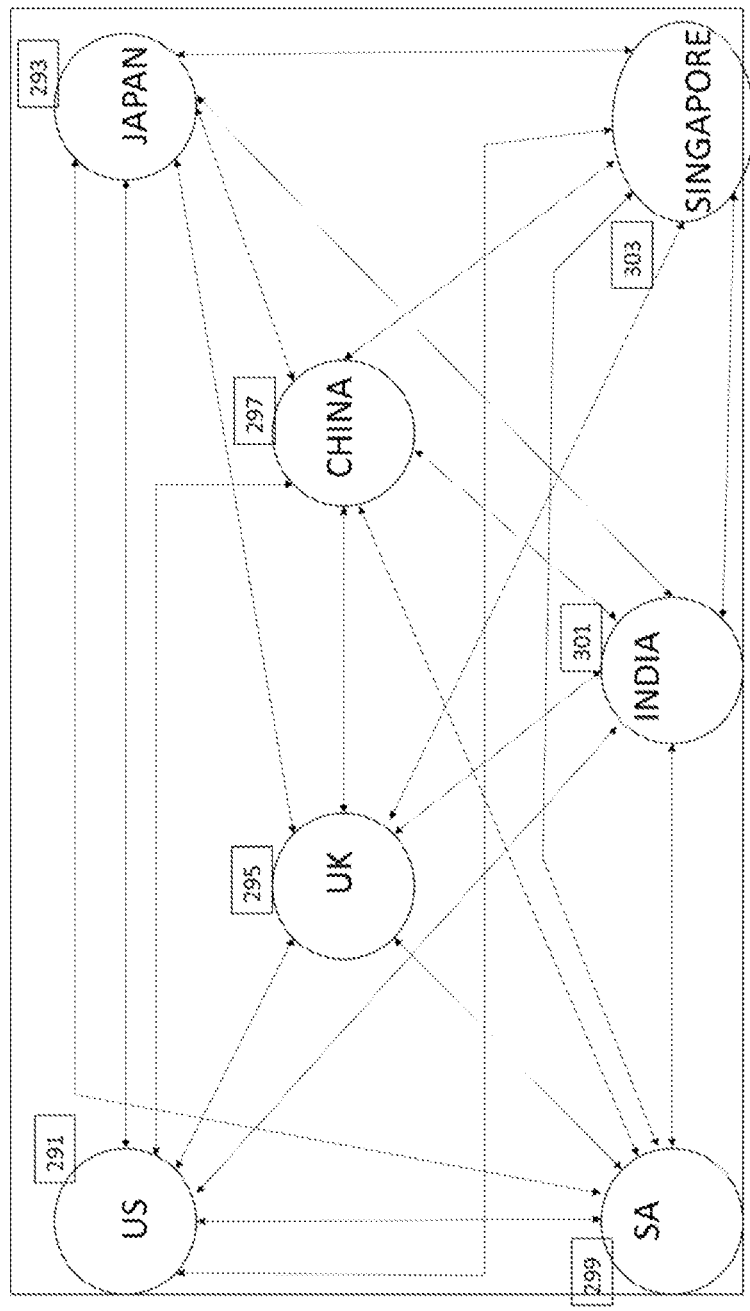
FIGS. 10 and 12 shows the DTC overlay without SG nodes or USC controller as in an embodiment.
Figure 11:
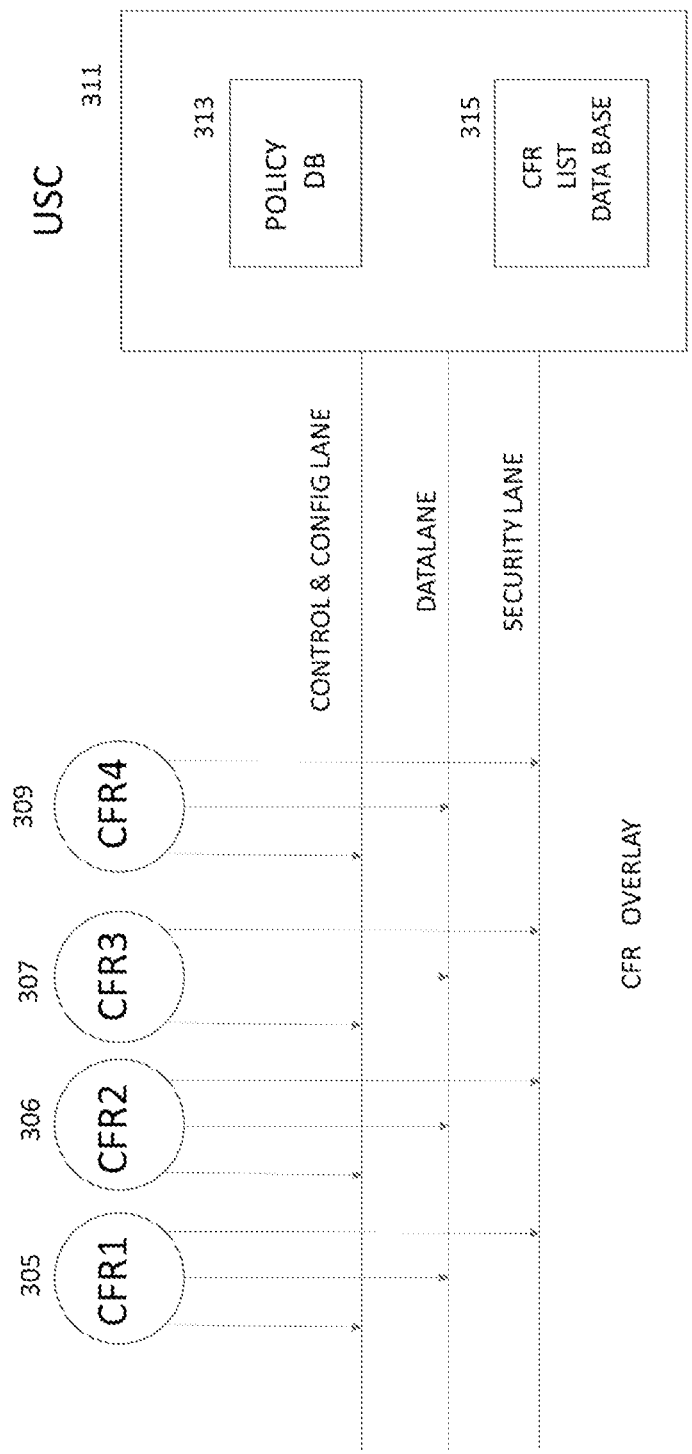
FIG. 11 is a block diagram illustrating the theory of operation of data flow between secure vaults and DTC controllers under the security control operations of USC, indicating separate channels for data transfer, security control and control or configuration exchange.

As security attacks happen in multiple forms, a single dimensional security protection cannot secure storage systems. It must be multi-dimensional, and in multiple layers. Security attacks can come from a ransomware can come from a malicious insider, can come from a Man-in-the middle attack. USC (Universal Security Controller) has agents installed in various systems holding valuable data assets. Every host, having agents installed, constantly communicate to USC transferring various security control and system activity data. USC controller has a policy and telemetry data base, taking various events to be considered against as attack scenarios. USC will send commands to storage agents to get sensitive and critical data assets to be transferred to other systems stored at isolated locations, with partial data in encoded in different formats. Once such format can be Reed Solomon encoding. When data is transferred from one system to another system across a WAN connection, data assets are routed across different paths across WAN at content level, as opposed to packet level as in traditional underlay routing. For one embodiment of the present disclosure, a set of Virtual Machines will be hosted in different data centers, in every country with knowledge of country and location information of the systems. This knowledge is stored as a graph in USC. Whenever a data needs to be transmitted from one location to another location in the Wide Area Network, USC can be configured to select a unique path from this graph or can be configured statistically or a combination thereof, for any pair of source and destination locations and will send command to security agent to transmit data, accordingly, including all Nodes to be visited for this path. Security agent, after fragmenting files with various dispersal technologies, data transformation, and leaving content gap blocks, select each fragment and gap blocks if any, and transfer across a unique path. For example, if one Node is stored in a data center in India and another Node in US, some fragments will be moved, at network devices level across Atlantic side of the Globe, visiting an intermediate Virtual Machine (VM) in EU, and other fragments will go through Pacific visiting an intermediate Node through Singapore on the way to US. Referring to FIG. 10; 291, 293, 295, 297, 299, 301 and 303 are the DTC nodes hosted in different countries. If a fragment sent from 301 (India) to 303 (SINGAPORE), it will never go through any intermediary located between India (301) and South Africa (299), unless there is a serious router flaps happened because of the way Layer 2/Layer 3 (L2/L3) devices work based on the principle of minimal cost-based packet routing to reduce the packet latencies. Invention makes use of this core observation by forcing the content to move through a pre-destined path, at content level with connection termination at every hop. Underlying packet routing systems cannot re-assemble the packet stream from beginning to end. Further, invention make use of separate channels of communication. Referring to FIG. 11; 305, 306, 307 and 309 are Content Forwarding Routers (also referred as DTCs) and use separate channels for Control or configuration traffic, Data traffic and Security traffic. Control and configuration Lanes will carry traffic containing data from Policy Database (313) and Security Lane will carry traffic for CFR List Database (315) update process. Regular content traffic will go through data lanes. Different channels or lanes can be provided by different network services providers for example, to further increase the security reliability guarantees to defend against the Man-In-the-Middle (MIM) attack scenarios.

Figure 12:
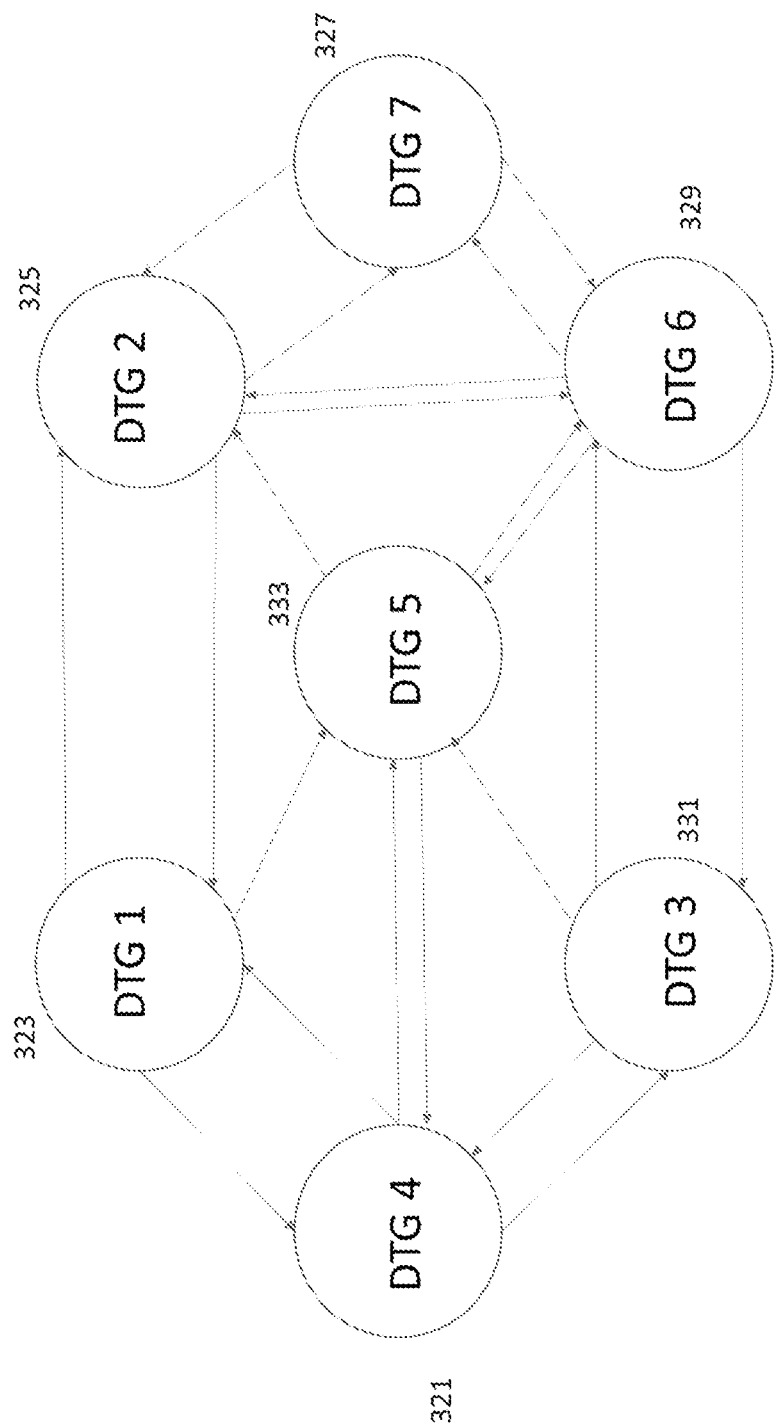

Referring to FIG. 12, an embodiment of a DTC overlay without a USC controller or SG node is shown. In this embodiment, DTC node itself has to get the information about other DTC nodes through a manual data entry operation into DTC system or by other means of DTC info collection process such as a cloud Application Programming Interface (API) based micro service running in the cloud relaying the node information about every DTC node. Disclosure defines this process as DTC-info collection operations. Every DTC node has to refresh its node state information periodically. Traditional Neighbor reachability and Link state graph building method of underlay, packet level routing can also be applied here with adaptions needed.

This is akin to overlay data routing, at application layer. All state management, end to end delivery of each fragment is handled by USC-DTC pair and keeps track of transmission status of every fragment from every Node to its immediate destination.

USC is connected to SG nodes, SV nodes, and various Data Transport Controllers in at least one of the embodiments of the present disclosure. Security and system agents running in all connected systems. USC also has various metadata for storage security management, security state and system states of various connected parts which is also redundantly stored. When any security or IT risk incident happens, USC engage SG nodes or Data Protection gateways to deliver various Contextual Risk Mitigation (also referred as CRM) Operations such as taking an immediate backup when there is an imminent hardware fault detected, or an immediate storage migration, across DTC nodes, is performed and system is shutdown when there is an insider caught on data exfiltration. Similarly, appropriate response is performed when there is a ransomware attack detected, such as informing all SG nodes not to update the existing backups with updated data, to prevent new data from corrupting old gold copy. Response also includes generating various threat alerts and updating the USC controller with various attack signatures. CRM operations are facilitated by a command policy database. As CRM operations triggers various IT operations driven by data telemetry and Machine learning logic, it is also an embodiment of automated Active Response. The present disclosure hereinafter uses AIOps and CRM operations interchangeably. This contextual data protection service is rendered by the USC controller as the response to a typical system or storage intrusion. New content can enter into the first SG node through a user using the embodiment by storing the content through a file folder service offered by SG node or through any form of data upload service. Data output operation is performed when a user needs to retrieve the content from the embodiment.

Figure 2:
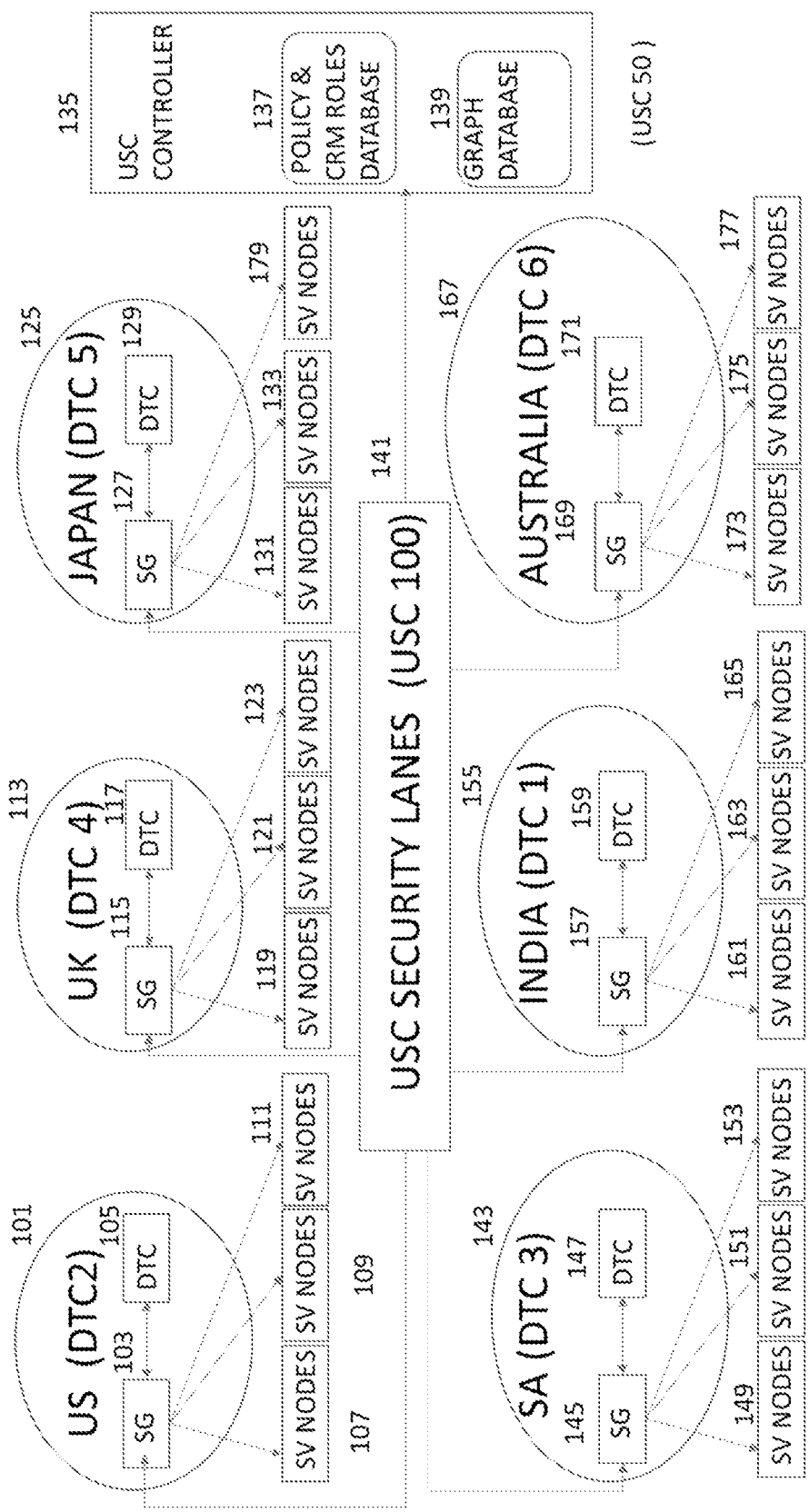
FIG. 2 is a block diagram illustrates various DTC nodes that can be specifically hosted in multiple countries with inter-country data movement control aspects shown.
Figure 3:
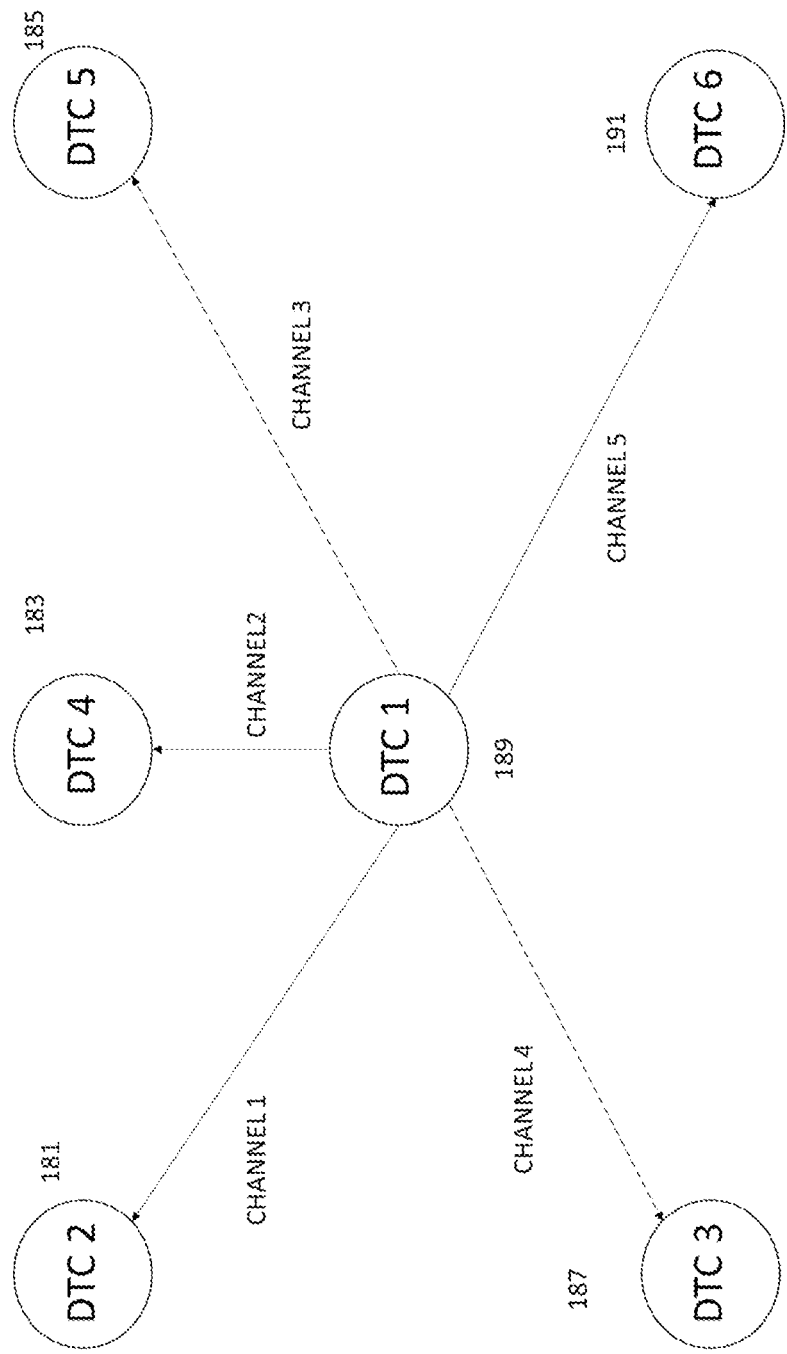
FIGS. 3,4,5,6,7,8 show the other connected DTC controllers as each DTC view its connected DTC peers in the overlay, for 6 DTC nodes as an example.
Figure 4:
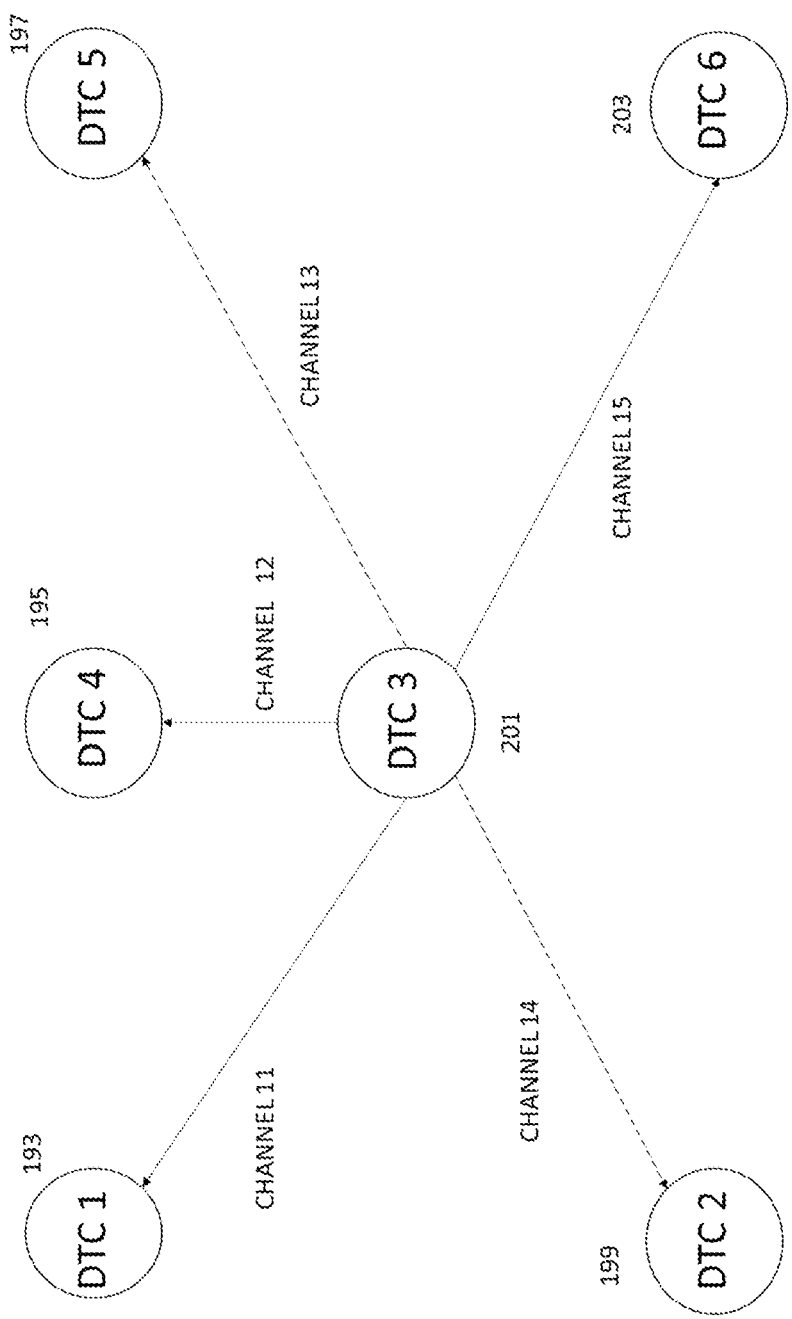
Figure 5:
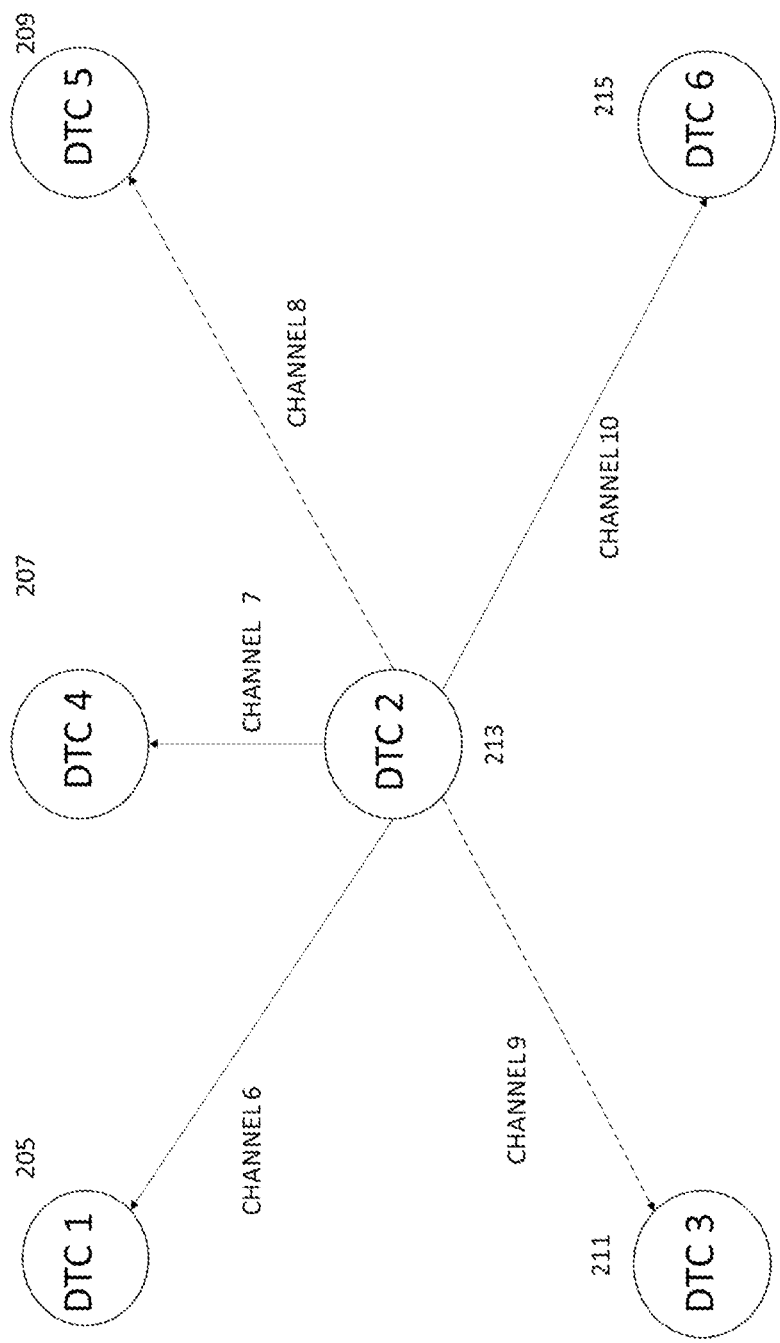
Figure 6:
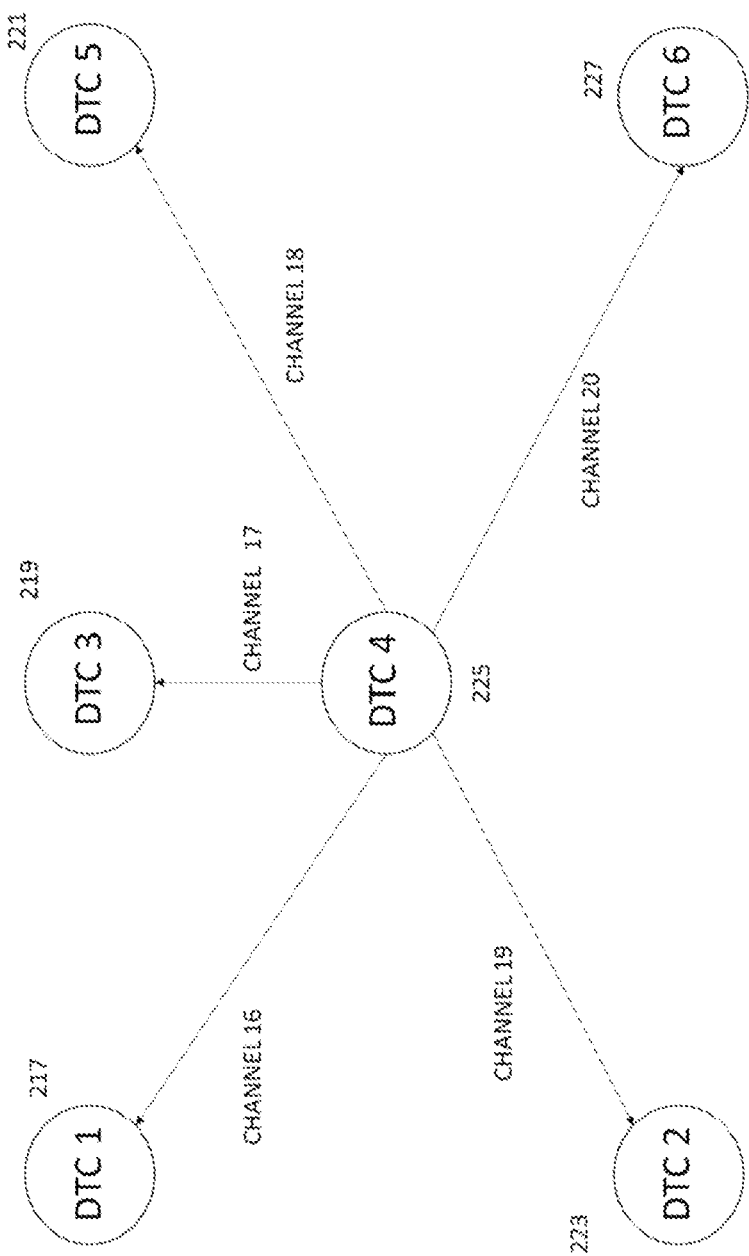
Figure 7:
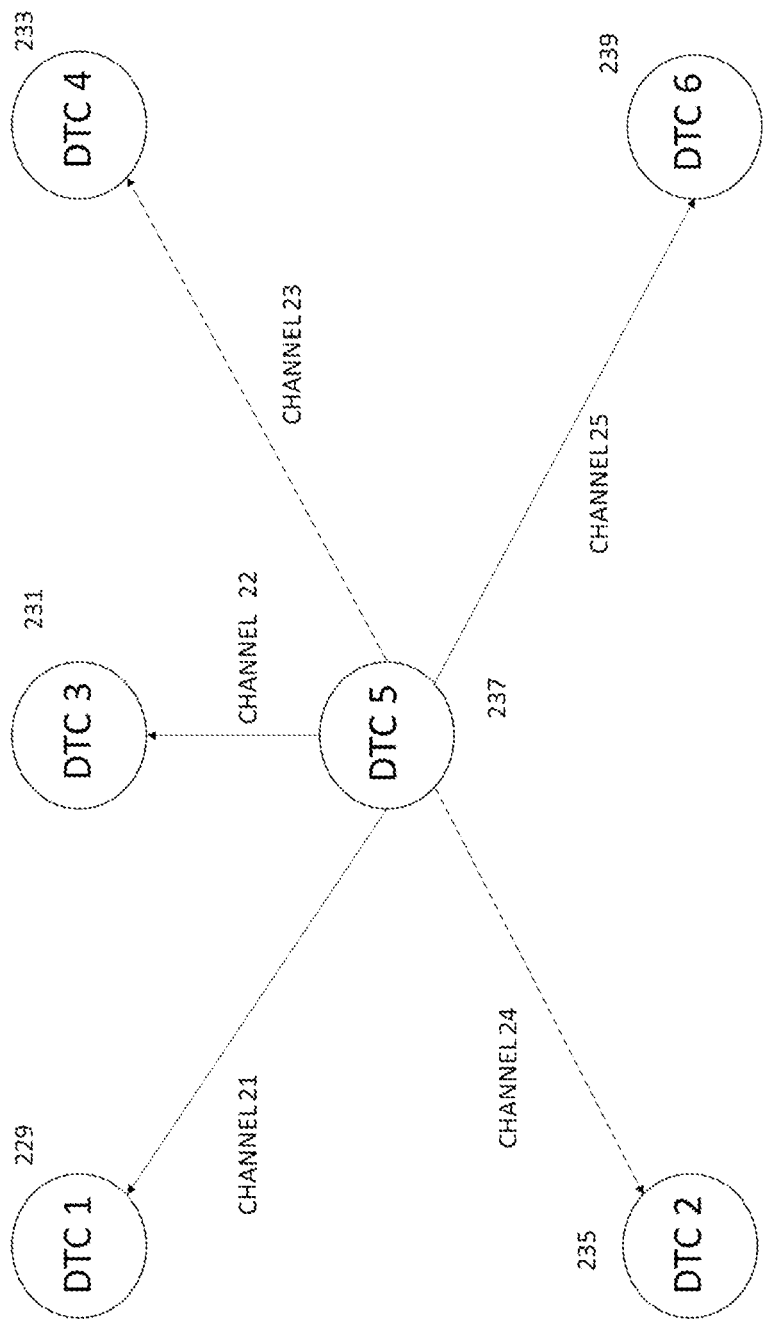
Figure 8:
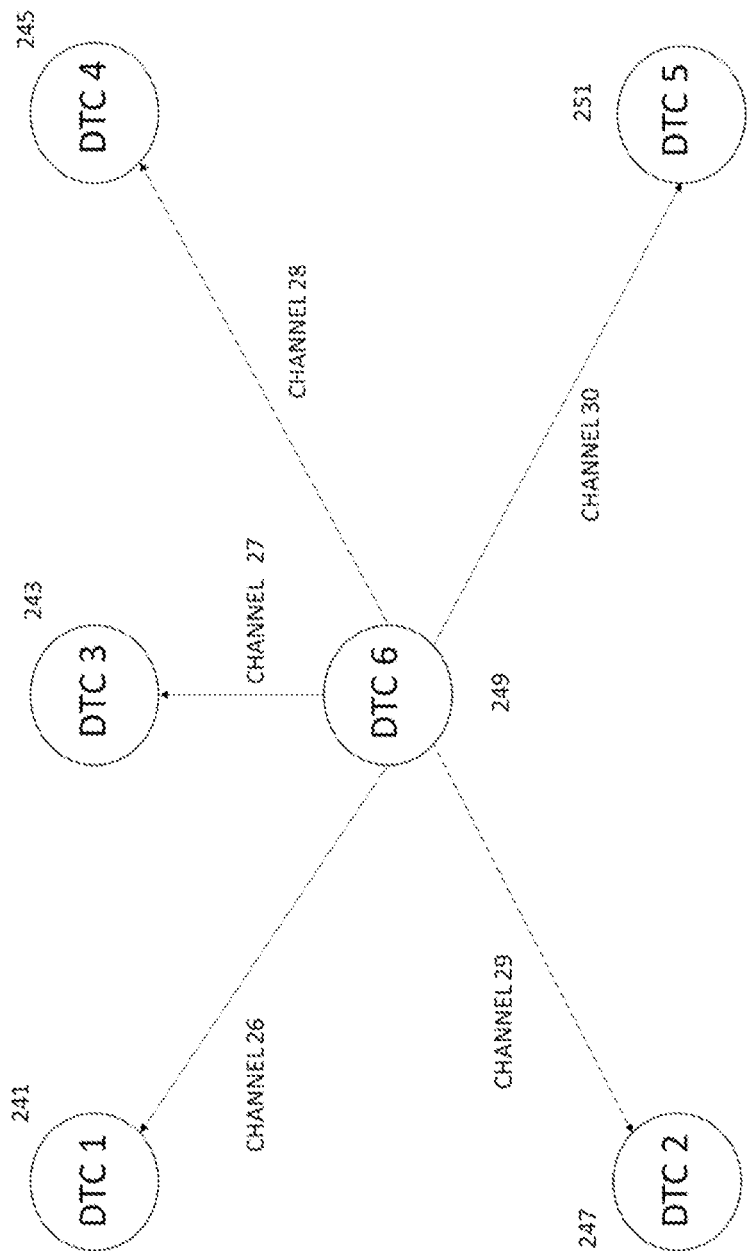
Figure 17:
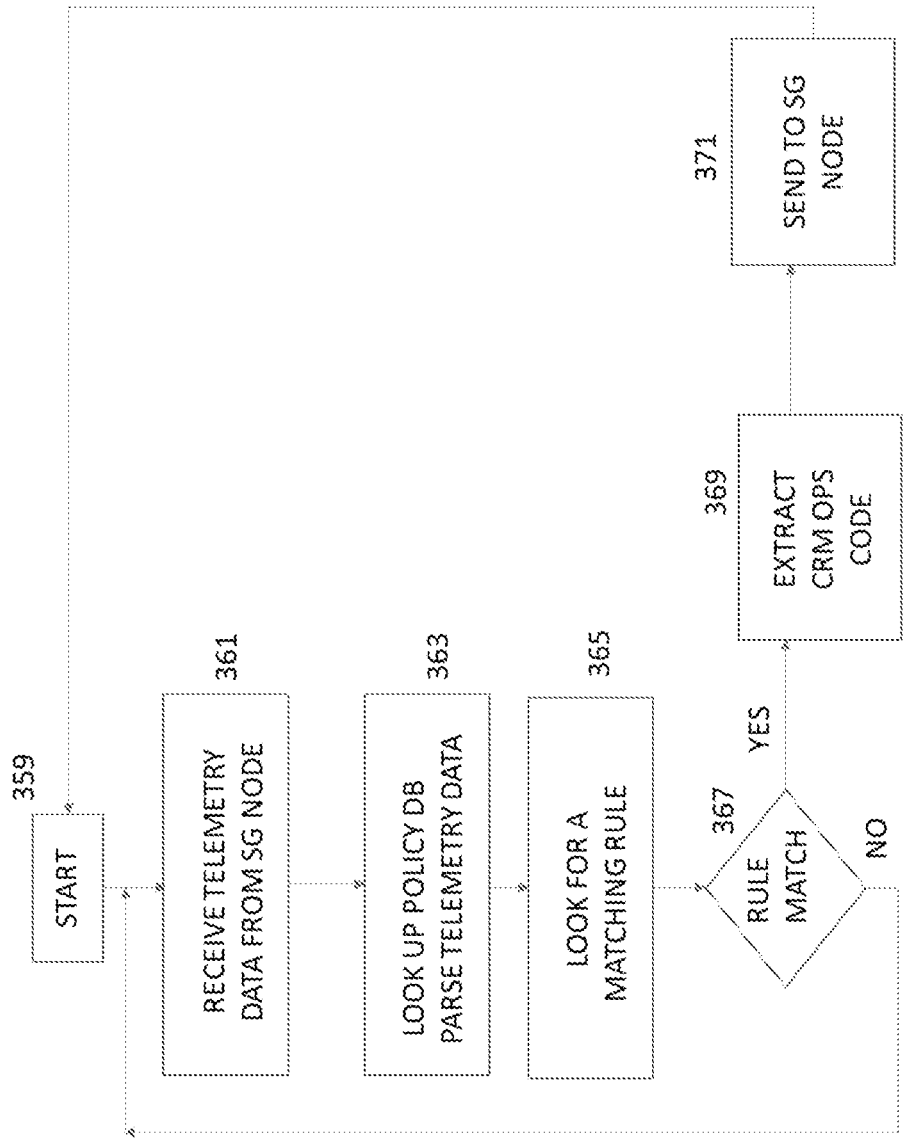
FIG. 17 is a high-level operational logic of a USC controller.

Referring to the FIG. 2, USC 50 (labeled 135) is the USC system, having all telemetry data sent from all DTC Nodes stored and processed. 6 DTC Nodes (labeled in 101, 113, 125, 143, 155 and 167) are shown as in an exemplary embodiment while the number of DTC Nodes can vary from 3 Nodes to a large number spanning throughout the world, hosted in private data centers or in the cloud, whereas each DTC Node can include a local storage gateway or external storage gateway attached over an IP network, with each storage gateway may have Secure Vault Nodes (SV Nodes) attached to it, forming the DTC Overlay Network. Each DTC Node has security modules constantly communicating to USC through USC security lanes (labeled as 141) identified as USC100. Each DTC, Storage Gateway systems is labeled as SG, and Secure Vault Nodes (SV Nodes) are identified as SV Nodes. For example DTC2 running in a DC in US (101) has SG node (labeled as 103) has SV nodes labeled as 107,109 and 111. Similarly for other DTCs in the figure. Secure Vault Nodes can also be implemented as a private cloud or in a public cloud. If SV Nodes are implemented as public cloud object storage in an embodiment, secure isolation capabilities and storage immutability features are absent for the embodiment in question if the cloud provider does not support that. USC controller can initiate a data transfer stored at-rest in the SV Nodes to be migrated to another geo location for any reason. The request hits the SG Node, which will in turn get each fragment of the data and sent to DTC Node connected closer to it which can be statically configured. This first SG Node, originating the data and first DTC Nodes, picks the data in the overlay network is called ingress SG Node and ingress DTC Node respectively. First DTC Node then identifies the destination DTC Node, which can be in another country. First DTC Nodes then pick a unique list of DTC Nodes which are stored in multiple countries and route the traffic to the next in the list, until it hits the last DTC Node which will terminate the data and deliver to the SG Node connected to it. The list of such node information can be represented by standard graph data structure. This is referred as node state graph. Last DTC node and SG node are called Egress DTC Node and Egress SG Node respectively. In some embodiments USC may have direct message exchange path established. In other embodiments, SV Nodes establish message and data exchange path between SG Nodes, which in turn establish message exchange path to DTC Nodes and USC controller. Message exchanged include the information such as number of processes currently running in SG Node, last access times of certain directories, last modification times of certain files, any access violations or login failures and so on and so forth depending upon the specific aspects and configurations of the environment. These types of data indicate any external intrusions in the system and act as storage intrusion parameters which are transmitted in real time to USC Node, by the USC agent module. Same type of information is sent from every DTC Node as well to the USC Node. USC Node has dedicated commands, instructions to deliver to SG Node or DTC Node to mitigate the intrusion. It can include commands like REMOTE SHUTDOWN, indicating to shut down some services, further isolating the intrusion source, such as ransomware entry point. Disclosure defines this method as SIPS, stands for Storage Intrusion Prevention System or as SIMS (Storage Intrusion Mitigation System). The remote command exchanged by the USC includes a real time storage migration from an SG Node to another SG Node, across the DTC overlay network. During such migration, DTC move each fragment in the SV Node across separate list of DTC Nodes, which completely eliminate the case a wire tapper getting more than two fragments to his/her possession. This way invention, facilitate real time mitigation of any intrusion detection events or IDE and invention defines this as RIM, stands for Real time Intrusion Mitigation commands. Referring to FIG. 15, which is a table that list simple example of an embodiment showing list of IDE on column 1. 1 such intrusion event is a Ransomware attack. On the second column, 03 is the RIM code. Internally, protected system can enumerate this to any system specific operation that needs to be executed in the protected system. Any insider theft event is responded with code 02 and so on. This table is just an example and can be extended to a wide array of configurable commands and corresponding response codes, which becomes custom real time IT operations. After the execution of CRM operations triggered by RIM codes, systems in question, send status messages back to USC. Different embodiments can make use of further attestations and challenge/response methods on validating every messages exchanged with various system part of data movement overlay as well as SV nodes to SG node communications. Referring to FIG. 17, a flow chart further illustrates this aspect of the invention. At step 359, logic flow starts at USC. At step 361 it receives telemetry data from SG node. USC node then moves to parsing and processing step at 365 to find a configured rule, which is essentially a command code as explained above for RIM codes. At step 367 it decided to go back to start state as USC found nothing special to do or found matching rule and proceeds to step 369 where it extracts the code to execute the operation, which is referred as Contextual Risk Mitigation (CRM) code. SG node is used here only for illustration purposes. As SG node, plays as the storage security controller operating upon the storage stored in SV nodes, attack mitigation on SG node itself is critical for security under-operation phase of the data life cycle. Instead of SG node, different embodiments can be configured to protect SV node or DTC node in a similar way. Typically, SG node will play the role of USC for all RIDE parameters processing for SV nodes and also to initiate RIM code transfer to SV nodes, as SV node runs with secure network isolation mode without opening up any in-bound connection to it. DTC nodes or SV nodes also can send RIDE parameters (Real-time Intrusion Detection Events) to USC and USC can respond with RIM codes to trigger the execution of CRM operations at the target system receiving the RIM codes. Once such CRM operation, in case of DTC node is to shut down the DTC node itself or sending an update message to USC indicating that this particular DTC node is compromised, initiating the eviction of the DTC node from the overlay, also referred as freeze-DTC operation in the literature. Thus data castle architecture includes the protection of operational systems like SG node, DTC node to protect data handled or operated upon by these systems. As data is always stored in erasure coded anonymized form with standard encryption, storage is secure at-rest. As data is again moved across exclusive path in the form of SP fragments, data stays attack and breach tolerant in-motion. This way, data castle architecture provides a novel method to realize Storage intrusion Response paired with a full life-cycled security, covering at-rest, in-motion and under-operation, as data moves in space across data life cycle.

As each fragment is erasure code, information theoretic split of the data, data cannot be revealed even with a quantum computer, at least a multiple paths are wire-tapped, which is making the attack theoretically less practical. FIG. 4, FIG. 5, FIG. 6, FIG. 7, FIG. 8 and the FIG. 9 connection states of each DTC shown in the exemplary embodiment.

Referring to FIG. 14, a data is moved from DTC 1 to DTC 5. It takes three fragments across three different paths as shown by the three exclusive lists of DTC nodes in the table in each row. First fragment goes through nodes DTC 4 and DTC 3 between source and destination. Second fragment goes through DTC2 and third one goes through DTC6. In a reed Solomon coding of 5 fragments, only 3 is needed for full recovery and follow three different paths. This minimal amount of SP fragments needing for full recovery is termed as minimal set SP fragment split-set. This number varies as the total number of fragments varies. This configuration of N: M aspects of RS coding is done during configuration time at USC.USC has wide array of configuration parameters that defines the list of remote CRM operations supported, information regarding connected SG nodes, connected CFR nodes and a static list of exclusive CFR lists showing exclusive CFR list for every DTC node to every other DTC nodes, with at least 2 exclusive paths between any DTC to any other DTC. As none of the paths has overlapping DTC Nodes, all SP fragments will be routed across the different network device by the underlying IP routing layers. At every DTC, there is a configured list of exclusive paths to any other DTC for each SP fragment to be forwarded through, if content is originated at the DTC in question. As the invention is routing content at application level, a wire-tapping inter-me diary cannot determine the full sequence of the content, because connection is setup and terminated for every fragment of the content, in addition to EP forwarding aspects. Every DTC there is an Rx process that receives the incoming fragment. First 1024 bytes of every fragment contains CFR List and information regarding the next DTC to be forwarded to. Every DTC node updates the header with the next DTC information in the CFR list as the next hop and forwards it to the next DTC, end to end CFR list is selected for a new fragment at the first DTC controller. This process is defined as EP forwarding, continues until the last DTC node is hit by the fragment. In this case, n is 5 and m is 3. As reed Solomon and its variants allow high values such as n/m as 70/40, information theoretic algorithms can be modified to avoid the theoretical possibility of overlapping network devices, without overlapping DTC Nodes. Additionally, data can further be redacted with gaps in data, which is sent in different network path or anonymized or embedding gap blocks as explained earlier, with any existing data engineering methods to make the possibility to practically zero.

Figure 9:
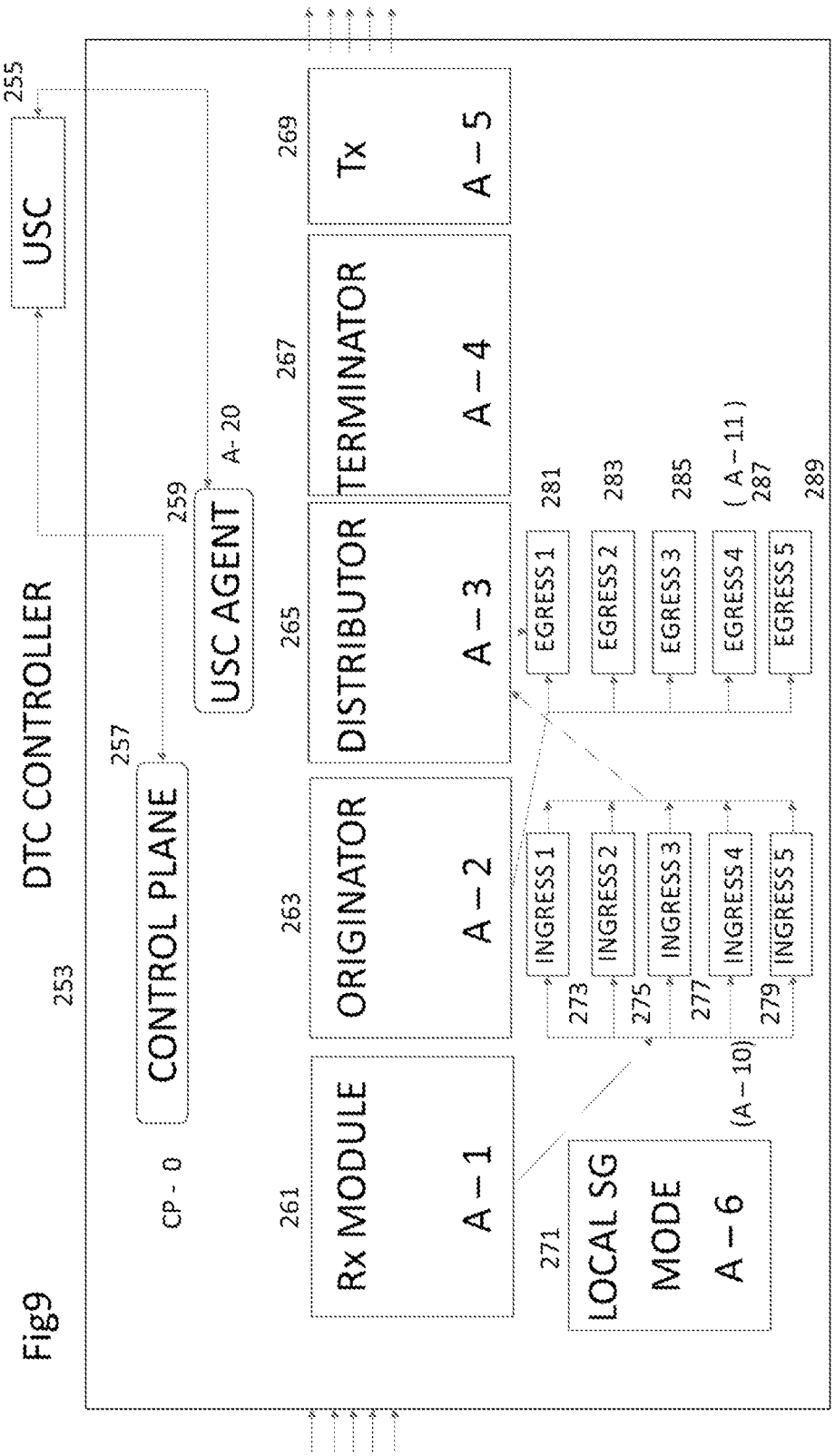
FIG. 9 shows the cross-section details of the DTC controller.
Figure 16:
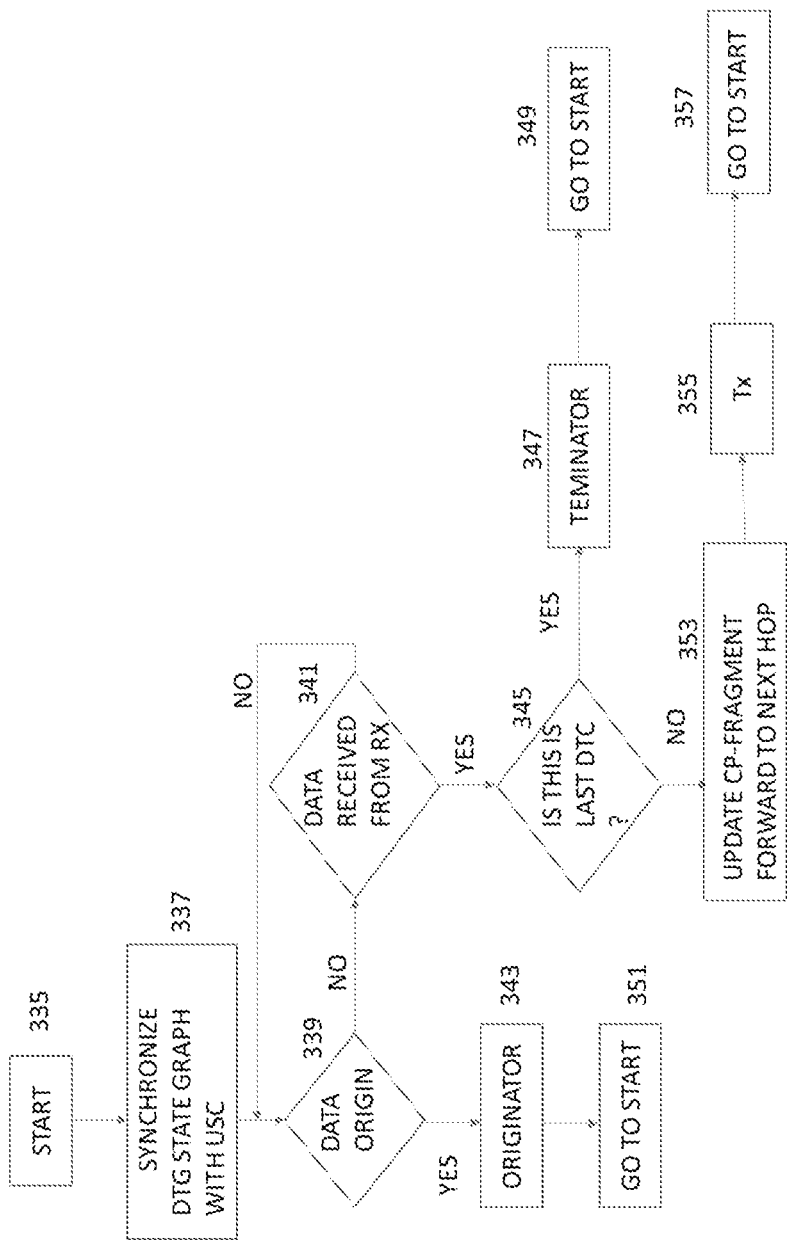
FIG. 16 is a high-level operational logic of a DTC node.

Referring to FIG. 9, a cross section of a specific DTC Node is explained. Control Plane, (labeled as 257) cp-0 receive various DTC route info updates and configures the DTC Nodes accordingly for the unique path selection logic. 257 receives all control, security and configuration messages from USC, exchange all PLT related messages with USC, send RIDE parameter messages with USC, and receive messages containing RIM codes from USC and initiate triggering CRM operations on the DTC node. Rx (Receiver) module (labeled 261) A-1 receive the traffic from any of the connected DTC Nodes. Tx (Transmitter) module (labeled 269) will further forward the content to upstream DTC Nodes. Originator module (labeled as 263), A-1, will create the path list header and embed into the content if this is the first DTC Node of the data traffic. Distributor module (labeled as 265), A-3, will do the role of updating the DTC path list headers and move to the egress queue for the upstream traffic. Terminator module, (labeled 267) as A-4 will terminate the traffic if the current DTC is the last DTC Node in the list and initiate the content delivery to the target SG Node. A-10 (labeled with (273,275,277,279 and 280) and A-11 (labeled 281, 283, 285, 287 and 289) are the ingress queue and egress queue respectively for the incoming and outgoing data traffic. ORIGINATOR module prepares the content for transmission by embedding the source-routing list (CFR list) in the content, so that content can be routed across all intervening DTC nodes along the path. Terminator module does the data termination operations at the terminal DTC. If the last node in the CFR list is the current node itself, content is delivered to the local DTC node. This process is also referred as data-termination (also referred as data termination) operation. A-6 (labeled as 271) is the local SG Node which can store data in SV Nodes or within the DTC system itself as required by the specific aspect of the embodiment in question. A-20 (labeled as 259) is the USC agent running in DTC Nodes as the security end point from USC (labeled as 255). DTC Node system itself is monitored for any intrusion, binary content verification of DTC modules. If there is any violation is detected at USC, USC will initiate intrusion detection actions that include bringing down the system as well. Referring to FIG. 16, a flow chart, 335 is the start step that includes starting the DTC node system itself. Step 337 indicates a synchronization phase of DTC with USC to get updated states of all DTC nodes in the overlay network. Essentially the list of all DTC nodes can be represented as a graph data structure as used for connected graph. Each DTC will initiate connections or send heartbeat messages in UDP, to check the availability and reachability. Each DTC then builds its DTC state graph. This can also be represented as a plain list of N XML files for every other DTC [DST] nodes. Each XML file can represent a list of all combinations of routes to a given destination. This list can further be pruned by weeding out the entries containing common DTC nodes, other than the source and destination. This is how a CFR List is created, which is inserted whenever new content is originated from the DTC. DTC keeps track of any DTC node in the overlay being down or back in operation and updates the DTC graph state. This process runs in the control plane, like similar ways a packet router update the forwarding table when there is a route change happens. It includes the IP addresses of every DTC nodes, port numbers to be used to contact Rx module of every DTC. DTC updates the list of Content Forwarding Routers (CFR) through which DTC Node can move the content through. DTC and CFR refer to same entity in the invention, using two terms to point to different aspects of the DTC (CFR). Every DTC can get an exclusive list of CFRs to reach to every other member, which refers to the CFR List. DTC then at step 339 check if the data originated its journey on this node, which is the case when connected SG nodes push the content to this node as the first node. If it is the case, it will execute the ORGINATOR module which will insert exclusive CFR List into each SP fragment. This can be at a fixed offset, typically before the fragment data start offset or any known offset. DTC nodes then push the fragment to egress queue and repeat the start step. This process is repeated for every SP fragment of the content. Only minimal set SP fragments need to be transmitted. DTC node checks if any data arrived from another DTC at step 341. If no data reception detected it goes back to start step. Otherwise, it checks if this is the last DTC in the CFR List at step 345. If this is the last node in the list, it has to terminate the fragment journey and wait for other fragments of the split-set to arrive, which is part of the fragment set represented in the initial header in the content. Once all fragments are received, DTC will initiate a content gap block request to receive the gap block metadata and gap block data. Using Gap block metadata, content offsets of the gap blocks are retrieved, and gap blocks are re-inserted and then retrieve the encryption key from the re-assembled content and CR operations begins. This is the logic of the terminator module. Every SP fragment will be preceded by an XML file, containing the original content name, total fragments needed, final destination DTC, next hop DTC information to facilitate all hop by hop and end to end processing. DTC information can be as simple as a DTC ID. DTC ID can be any unique no which can be configured at USC, which is distributed to all DTC. DTC is also referred as CFR interchangeably, as every DTC not as the first or the last DTC, it is functioning only as a forwarding node (Content Forwarding Router). Initial fragment header containing CFR List is only created at the first DTC.

Figure 18:
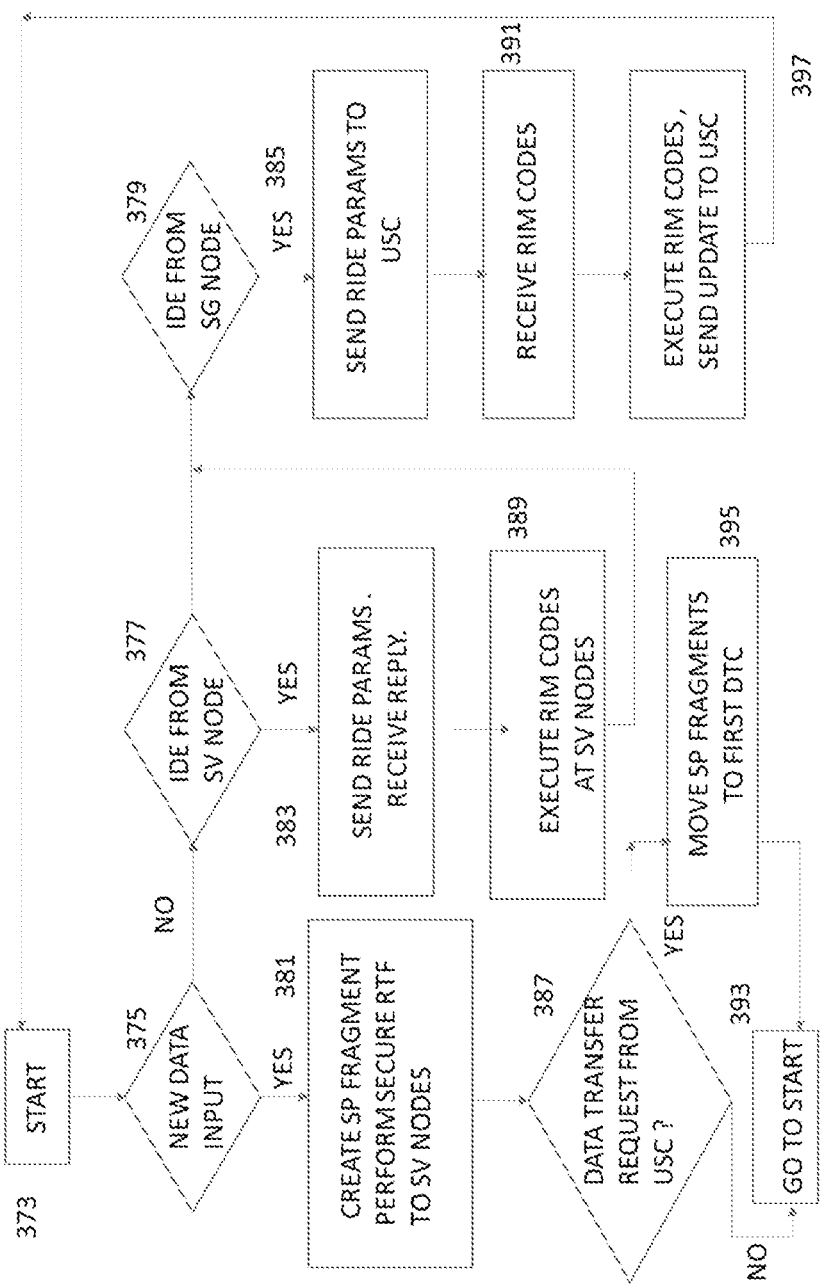
FIG. 18 is a high-level operational logic of an SG node.

If this is not the last DTC, at step 353, it will then advance the CFR List by one node and update the next Node information as the next hop CFR and update the CP fragment header as inserted by the ORIGINATOR and it transmit the fragment to next hop at step 355 and goes to start phase at step 357. Similar to the forwarding logic as explained above, it is also helpful to understand the operation logic of SG node that push content into DTC node or pull out of it in at least one embodiment. Referring to FIG. 18, which is a flow chart illustrate the SG node operation logic. At step 373 SG node starts up by syncing up with USC and other initialization steps. Then look at any new data arrival at step 375. If new data arrives, it will be converted into SP fragments and move the fragments to SV nodes through Secure RTF operation explained earlier. At step 387, it checks if there is a request from USC for any data transfer from SV nodes to CFR overlay. If this is the case, data transfer of SP fragments of the requested content to the first DTC attached to the SG node is performed and SG node goes back to initial step. At step 377 SG node detects any Intrusion Detected Event (IDE). If that is the case, it goes to step 383 wherein SG node send the IDE parameters in Real time. Invention refers this process of updating USC in real time with any IDE events as RIDE params exchange. At step 389 SG node send RIM codes received from USC to SV nodes. This can include a SHUTDOWN of the Secure Vault or can include the execution of any AIOps operations that is generated from SG node which was in turn received from USC. At step 379 SG nodes checks if there is an IDE event at SG node itself. If found, it sends RIDE params to USC at step 385 and receive RIM codes from USC at step 391 and move on to the execution of the received RIM code at step 397 and goes to start state. RIDE parameters can include even abnormal events in system logs, audit logs. Aspects such as what log files of the system to be monitored, what directories and files to be protected, the system activity events to be considered as suspicious is termed as security parameters. USC issues various commands through RIM codes, for security control and is termed as security control commands in the disclosure. This facilitates storage prevention or SIPS (Storage Intrusion Prevention System) in real time. SV nodes send RIDE parameters to SG nodes attached to it and SG nodes process it, select the right RIM code and send to SV nodes. SV node is also capable of executing matching CRM operation for a given RIM code, such as restarting or stopping the vault service. Whenever there is a RIM code message exchange happens from USC to SG node, SG node will trigger a recursive CRM processing to SV nodes. RIDE parameters are collected from all DTC nodes, all SG nodes to be transferred to USC for analysis which kicks off RIM code transfer if any anomaly is found, triggering various CRM operations at affected SG nodes and DTC nodes as explained earlier in the disclosure. In some embodiments, CRM operations code itself is exchanged from USC instead of RIM codes, but end result is same, resulting in the execution of right CRM operations matching RIDE parameters pattern.

Referring to FIG. 1 again, essentially forming a "castle" like architecture for protecting data stored in SV nodes with no trust is assumed on any component except USC which is maintained by the security administrators with higher privileges. USC has the control to instantly disallow any data movement operations across data lanes, referred as kill-data-path (KDP) operation when there is a security incident detected, as part of Active Response Commands triggered by CRM operations. Whenever there is a Ransomware attack signature is found which is an example of a storage intrusion or a BV signature incident (system intrusion), USC can be configured by its security policies to select KDP messages by the AIOps module, which is triggered as a matching RIM code to get right CRM operation executed for a specific RIDE parameters as detected in the security telemetry processing. KDP messages encode the RIM codes to kick off matching CRM operation for KDP feature, as various CRM operations are possible, such as Kill the Data Path (KDP), essentially shutting of all data flows between SG node and SV nodes, or across SG nodes between the sites. To initiate a Kill Data Path operation, USC send KDP Message code, containing RIM code configured for CRM operations for KDP, and send to SG node and DTC nodes routing data from this specific SG node. SG nodes and DTC node then send KDP response messages back to USC. SG node instantly communicate this to all SV nodes, and SV node also send KDP response messages back to SG node. After this, CRM operations executed at SG node, DTC node and SV nodes which essentially stops the data movement from or to secure vaults, as done by SG nodes receiving the command, which itself shuts down the data service. SG node will send messages to all connected SV nodes to drop all data connections to SG nodes and USC. SG nodes drop all data connections to DTC nodes. At this stage, system data path is frozen, though control path and security path continue operational, Data lanes are empty with no traffic movement. CRM operation execution can be configured to execute in a variety of modes as required by the embodiments. CRM operations thus facilitate storage Intrusion Response (SIR) and realize Ransomware Attack Resilient Systems. As data is moved across exclusive path routed tunnels, and data is stored in un-intelligible pieces across multiple SV nodes, any single point attack reveals or exposes no data. This design is the main characteristics of a data castle design, avoiding storage intrusion, as a Storage Intrusion Avoidance System (SIAS), with No Single Point of Attack (NO-SPA) surface. Further, SG nodes are under constant cyber telemetry from USC, having the capability to control if any abnormal storage operations are detected, realizing security under-operation capability. As various intrusion and attacks are detected and mitigated as the data moves in space. Whether it is stored, or operated upon by various applications under the control of SG nodes (under-operation phase) and when data is moved across SV nodes over the DTC overlay, design offers a Zero Trust Architecture for the entire phase of a data, hence the relevance of Zero Trust Data castle architecture. In some embodiments, manual interventions are needed to restore the data path operations due to the zero trust design principles of system and storage architecture. In certain configurations, data path operations can be restored once system or storage intrusions are detected, responded, mitigated and full recovery was done through data cleanup or system re-imaging and Administrator can re-initiate data path operations by KDP restore messages sent across config lanes, and security hand-shake messages which are essentially, and standard CHALLENGE/RESPONSE based protocols through security lanes. Without a Data Castle like design, this instant Kill-Data-Path service cannot be implemented to shut down and restore storage service across all secure vaults and also across SG nodes across the overlay, because of the design integration of security operations and storage operations. As USC has the interception ability on how content is routed across overlay, how storage services are orchestrated at SG node, depending upon the intrusion event data (IIP or RIDE parameters), USC and SG node paired to control storage services in an automated manner. This system level architecture invention and attached methods are extremely critical to contain intrusion attacks and to further contain lateral movement attacks such as from Ransomware. Like kill data path (KDP), many variants of storage service operations controls can be achieved, which has profound impact on system architecture on delivering Ransomware Attack Resilience System (RARS) experience that goes beyond snapshots and immutability. This design feature offers wide ranging risk tolerance and automated storage security operations possible according to the needs of different embodiments. With these KDP operations, Security Admins have the full control on mitigating lateral movement of the attack.

As the system has CRM operations to disallow modifying backups whenever there is a Ransomware signature is detected, system is Ransomware Resilient. Due to the security by-design architecture, security operations are automatically executed by the AIOps module triggering Active Response on storage or system intrusion. KDP operations could also mean to initiate storage migration from any of the secure vault to SG Node or directly to any DTC node, data is transformed to SP fragments and data is moved across the overlay to a terminal DTC which then transmits the recovered SP fragments is sent to an attached SG node which then move it to other SV nodes. SP fragments reassembly can be performed at terminal DTC node or at SG node attached to terminal DTC node or can be delayed altogether. All this operations are configured by the AIOps rules configured at USC, which controls the end to end data security at-rest when it is stored in secure vaults and in-motion when it is moved across the overlay or under-operations when it is processed by SG nodes. As configurations, security posture and data movements are controlled by independent channels, USC has more control on the resilience of the system, further reminding us on the attack-tolerance architecture as a Zero Trust Data Castle. If any of the KDP messages are lost by the SG nodes or at SV nodes, USC keep transmitting the KDP or other matching CRM codes until there is a matching response code from SG nodes and SV nodes are received at USC. As the architecture of the invention takes care of all aspects of storage intrusion whether it is at-rest, under-operation or in-transit, with integrated data protection and security features with storage intrusion response operations, system delivers true security by-design and by-default.

In one embodiment, the system for implementing Zero Trust Data Castle includes multiple Data Transport Gateways (DTC) nodes located in a wide area network, spanning countries and continents. The system includes a plurality of Storage Gateway (SG) nodes sending secret partition (SP) fragments to DTC node. The system includes a plurality of Secure Vault (SV) nodes storing the above mentioned fragments, before or after being transported over the tunnel network. The system includes a universal security controller (USC) node, communicatively connected to DTC nodes for populating and updating content forwarding paths to DTC nodes, wherein the USC node exchange executable instructions with DTC nodes, SG nodes and SV nodes for Contextual Risk Mitigation (CRM) operation codes executing Active Response commands.

The system wherein is configured to implement the following: a kill data path (KDP), a Storage Intrusion Response (SIR) for data under-operation, a NO-Single Point of Attack (NO-SPA), for data at-rest, and as a Ransomware Attack Resilient System (RARS).

The method for implementing Zero Trust Data Castle includes the following steps: storing the SP fragments in a plurality of SV node, disabling all network service connectivity for any in-bound connection initiation to SV node, making the data stored in SV nodes immutable, generating the telemetry data at SV nodes and SG nodes, transmitting the telemetry data to USC controller, analyzing the telemetry data at USC controller, detecting the intrusion indication parameters (IIP), sending RIM codes to SG nodes and SV nodes from USC, upon a match detection, initiating CRM operations at SG node and/or SV nodes, migrating SP fragments to other SV nodes, initiated at SG node, through overlay network, if attack response policy match found, performing Exclusive path forwarding (EPF) operation on SP fragments, performing content reassembly (CR) operations at the terminal DTC node, storing SP fragments in another set of SV nodes; and receiving CRM response messages at USC, wherein the SV nodes, the SG nodes and the DTC exchange security control commands, security parameters and configuration parameters with USC.

The method for implementing Kill Data Path (KDP) includes the following steps: performing the binary verification (BV) operations at any of the SG node, performing the BV operations at any of the SV nodes, selecting the KDP operations at USC, receiving the KDP operations at every SV nodes and SG nodes, performing the CRM operations on all DTC nodes and SG nodes in response to KDP-operations, and receiving KDP Response messages at USC, wherein the SV nodes, the SG nodes and the DTC exchange security control commands, security parameters and configuration parameters with USC.

The method for implementing SIR includes storing the SP fragments in a plurality of SV nodes, disabling all network service connectivity for any in-bound connection initiation at SV node, making SV nodes immutable, keeping certain file contents as reference files for change tracking, detecting the IIP signatures, sending RIM codes to SG nodes from USC, upon a match detection, Initiating CRM operations at SG node, migrating SP fragments to other SV nodes, initiated at SG node, through overlay network, performing EPF operation on SP fragments, performing CR operations at the terminal DTC node, and storing SP fragments in another set of SV nodes, therein the SV nodes, SG nodes and DTC exchange security control commands, security parameters and configuration parameters with USC.

The method for implementing Storage Intrusion Avoidance System (SAIS) for data in-motion includes the following steps: performing the binary verification (BV) operations on all DTC nodes in the CFR list for each SP fragment and performing the CRM operations on all DTC nodes in the CFR list for each SP fragment, wherein the SV nodes, SG nodes and DTC exchange security control commands, security parameters and configuration parameters with USC.

The method for implementing Ransomware Attack Resilience System (RARS) includes the following steps: storing the SP fragments in a plurality of SV nodes, disabling all network service connectivity for any in-bound connection initiation at SV node, making SV nodes immutable, keeping certain file contents as reference files for change tracking, detecting the ransomware attack signatures, sending RIM codes to SG nodes from USC, upon a match detection, initiating matching CRM operations at SG nodes, initiating matching CRM operations at SV nodes, migrating SP fragments to other SV nodes, initiated at SG node, through overlay network, performing EPF operation on SP fragments, performing CR operations at the terminal DTC node, and storing SP fragments in another set of SV nodes, wherein the SV nodes, the SG nodes and the DTC exchange security control commands, security parameters and configuration parameters with USC.

I claim:

1. A method for implementing Zero Trust Data Castle, the method comprising:
   storing a plurality of secret partition (SP) fragments in a plurality of Secure Vault (SV) nodes;
   disabling all network service connectivity for any in-bound connection initiation to the plurality of SV nodes;
   making data stored in the plurality of SV nodes immutable;
   generating telemetry data at the plurality of SV nodes and a plurality of Storage Gateway (SG) nodes;

transmitting the telemetry data to a universal security controller (USC) node;
analyzing the telemetry data at the USC node;
detecting Intrusion Indication Parameters (IIP);
sending real time intrusion mitigation (RIM) codes to any SG node of the plurality of SG nodes or to any Data Transport Controller (DTC) node of a plurality of DTC nodes from the USC node, upon a match detection;
initiating Contextual Risk Mitigation (CRM) operations at any SG node of the plurality of SG nodes or any set of SV nodes of the plurality of SV nodes;
migrating the plurality of SP fragments to a selected set of SV nodes of the plurality of SV nodes, initiated at any SG node of the plurality of SG nodes, through overlay network, when attack response policy match found;
performing Exclusive path forwarding (EPF) operation on the plurality of SP fragments; and
receiving CRM response messages at the USC node;
wherein the plurality of DTC nodes are located in a wide area network, spanning countries, wherein the plurality of SG nodes act as storage security controllers sending the plurality of SP fragments to any DTC node of the plurality of DTC nodes, wherein the plurality SV nodes store the plurality of SP fragments, wherein the USC node is communicatively connected to the plurality of DTC nodes and the plurality of SG nodes;
wherein the plurality of SV nodes, the plurality of SG nodes and the plurality of DTC nodes exchange security control commands, security parameters and configuration parameters with the USC node and the plurality of SV nodes are connected to the plurality of SG nodes with secure network isolation capability.

2. The method as claimed in claim 1, wherein the method comprises implementing Kill Data Path (KDP).

3. The method as claimed in claim 2, wherein implementing the KDP comprises:
performing binary verification (BV) operations at a selected SG node of the plurality of SG nodes or at a selected set of SV nodes of the plurality of SV nodes;
selecting KDP operations at a USC node;
sending KDP messages to the selected SG node or the plurality of DTC nodes from the USC node,
sending KDP messages to the selected set of SV nodes from the selected SG node,
receiving the KDP messages at any DTC node of the plurality of DTC nodes, or the selected set of SV nodes or the selected SG node;
performing the CRM operations at any DTC node of the plurality of DTC nodes, or the selected SG node or the selected set of SV nodes in response to the KDP messages; and
receiving KDP Response messages at the USC node or the selected SG node.

4. The method as claimed in claim 1, wherein the method comprises implementing Storage Intrusion Response (SIR) for data under-operation.

5. The method as claimed in claim 4, wherein implementing the SIR comprises:
storing the SP fragments in a plurality of SV nodes;
disabling all network service connectivity for any inbound connection initiation at the plurality of SV nodes;
keeping selected file contents as reference files for change tracking;
detecting IIP;
sending RIM codes to a selected SG node of the plurality of SG nodes from a USC node, upon a match detection;
Initiating CRM operations at the selected SG node;
migrating the SP fragments to a selected set of SV nodes of the plurality of SV nodes, initiated at the selected SG node, through overlay network; and
performing EPF operation on the SP fragments;
wherein the plurality of SV nodes, the plurality of SG nodes and the plurality of DTC nodes exchange security control commands, security parameters and configuration parameters with the USC node.

6. The method as claimed in claim 1, wherein the method comprises implementing Storage Intrusion Avoidance System (SAIS) with life-cycled security.

7. The method as claimed in claim 6, wherein implementing the SAIS comprises:
performing binary verification (BV) operations on all DTC nodes in a Content Forwarding Router (CFR) list for each SP fragment and the plurality of SG nodes;
receiving Real time Intrusion Detection Events (RIDE) parameters from a plurality of DTC nodes and the plurality of SG nodes at a USC node,
receiving RIDE parameters from the plurality of SV nodes at the plurality of SG nodes,
analyzing the RIDE parameters at the USC node,
Selecting and sending RIM codes to a selected SG node of the plurality of SG nodes or any DTC node of the plurality of DTC nodes from the USC node,
Analyzing and selecting RIM codes to a selected set of SV nodes of the plurality of SV nodes from the selected SG node;
sending the selected RIM codes to the selected set of SV nodes from the selected SG node, and
performing CRM operations on the selected SG node, or the selected set of SV nodes,
wherein the plurality of SV nodes, the plurality of SG nodes and the plurality of DTC nodes exchange security control commands, security parameters and configuration parameters with the USC node.

8. The method as claimed in claim 1, wherein the method comprises implementing Ransomware Attack Resilience System (RARS).

9. The method as claimed in claim 8, wherein implementing the Ransomware Attack Resilience System (RARS) comprises:
storing the SP fragments in a plurality of SV nodes;
disabling all network service connectivity for any inbound connection initiation at the plurality of SV nodes;
making data stored in the plurality of SV nodes immutable;
keeping selected file contents as reference files for change tracking;
detecting ransomware attack signatures;
sending RIM codes to a selected SG node of the plurality of SG nodes or a selected DTC node of the plurality of DTC nodes from a USC node, upon a match detection;
initiating matching CRM operations at the selected SG node or the selected DTC node;
initiating matching CRM operations at any set of SV nodes of the plurality of SV nodes, connected to the selected SG node;
migrating the SP fragments to a selected set of SV nodes of the plurality of SV nodes, initiated at the selected SG node, through overlay network; and
performing EPF operation on the SP fragments.

* * * * *